United States Patent
Hara et al.

(10) Patent No.: US 6,434,932 B2
(45) Date of Patent: Aug. 20, 2002

(54) CONTROL MECHANISM WITH ACTUATOR EMPLOYING SHAPE MEMORY ALLOY AND METHOD FOR ADJUSTING SERVO CONTROL OF THE CONTROL MECHANISM

(75) Inventors: Yoshihiro Hara, Kishiwada; Junichi Tanii, Izumi; Shigeru Wada, Kishiwada; Akira Kosaka, Yao, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/814,068

(22) Filed: Mar. 22, 2001

(30) Foreign Application Priority Data

| Mar. 23, 2000 | (JP) | 2000-081993 |
| Mar. 23, 2000 | (JP) | 2000-082000 |
| Mar. 28, 2000 | (JP) | 2000-088374 |
| Mar. 28, 2000 | (JP) | 2000-088380 |

(51) Int. Cl.⁷ .............................................. F01B 29/10
(52) U.S. Cl. ..................................... 60/527; 60/528
(58) Field of Search .................................. 60/527, 528

(56) References Cited

U.S. PATENT DOCUMENTS

| 4,348,624 A | * | 9/1982 | Anderson et al. ............ 318/634 |
| 4,551,975 A | * | 11/1985 | Yamamoto et al. ............ 60/528 |
| 4,860,040 A |   | 8/1989 | Tamamura et al. |
| 4,932,210 A |   | 6/1990 | Julien et al. |
| 5,459,544 A |   | 10/1995 | Emura |
| 6,152,108 A | * | 11/2000 | Adachi et al. ............... 123/399 |

FOREIGN PATENT DOCUMENTS

| JP | 7210944 | 8/1995 |
| JP | 7274561 | 10/1995 |

OTHER PUBLICATIONS

Kuribayashi, Katsutoshi, "Mathematical Model for Control Element Using Shape Memory Alloy, and Position and Force Control", Systems and Control, vol. 29, No. 5, 1985, pp. 288–205.

* cited by examiner

Primary Examiner—Hoang Nguyen
(74) Attorney, Agent, or Firm—Burns, Doane, Swecker & Mathis, LLP

(57) ABSTRACT

A controller in which an actuator has a shape memory alloy (SMA), for controlling a position of a member driven by the actuator. The controller includes the SMA, a spring coil connected to the SMA, an operation device for calculating a voltage to be supplied to the SMA on the basis of information upon a target position and an actual position of the member, a voltage supplying device for supplying the voltage to the shape memory alloy on a basis of a result of operation performed by the operation device, only when the member is moved in a direction in which the SMA returns to a predetermined length that is memorized by itself.

28 Claims, 17 Drawing Sheets

CONTROL MECHANISM WITH ACTUATOR EMPLOYING SHAPE MEMORY ALLOY AND METHOD FOR ADJUSTING SERVO CONTROL OF THE CONTROL MECHANISM

This application is based upon application Nos. 2000-81993, 2000-82000, 2000-88374 and 2000-88380 filed in Japan, the contents of which are hereby incorporated by reference.

BACKGROUND OF THE INVENTION

1. Field of the Invention

The present invention relates to a control mechanism having an actuator which employs a shape memory alloy, and relates to a method for adjusting its servo control of the control mechanism.

2. Description of the Related Arts

In recent years, there has been a growing demand and necessity of a miniature mechanism for controlling a position of a driven member to be moved, which can be employed for a compensation mechanism to correct any blurred image caused by a camera shake of a lens shutter camera, for example. In order to satisfy such a demand and necessity, there is proposed an actuator which makes use of a shape memory alloy (or SMA) and a spring. As a method for controlling the actuator which makes use of the shape memory alloy, there has been proposed an on/off controlling method only, in which it is employed as a switch. On the other hand, a "System and Control, Vol. 29, No. 5: Kuribayashi, 1985" discloses mathematical models of control elements employing the shape memory alloy, and it discloses a PID control. However, it does not disclose any concrete technique thereof.

SUMMARY OF THE INVENTION

Accordingly, it is an object of the present invention to provide a control mechanism for controlling position of a driven member by employing an actuator which makes use of the shape memory alloy.

It is another object of the present invention to provide the control mechanism having the actuator which is simple in construction and compact in size.

It is still another object of the present invention to provide a method for adjusting servo control of the control mechanism, in which a driving condition of the control mechanism is stabilized, and in which error in the servo control is small (i.e. accuracy in the servo control is high).

In accomplishing these and other objects of the present invention, according to one aspect thereof, there is provided a control mechanism comprising: a shape memory alloy which memorizes a predetermined dimension thereof; a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator; an operation means for performing an operation repeatedly on a basis of information upon a target position and an actual position (or then position or existing position) of the driven member, and for calculating a voltage to be supplied to the shape memory alloy; and a voltage supplier having a limiting circuit for supplying the voltage, calculated by the operation means, to the shape memory alloy, only when the driven member is moved in the first direction, on a basis of a result of the operation performed by the operation means.

In the mechanism, preferably, the biasing device is a spring such as a bias spring.

In the mechanism, the first direction and the second direction may be opposite to each other.

According to the mechanism, the limiting circuit of the voltage supplier limits, or stops, the supply of the voltage, gained by the operation (or calculation) of the operation means, to the shape memory alloy, when the driven member should be moved in the second direction, on a basis of a result of the operation performed by the operation means. By the way, the operation performed by the operation means includes not only the operation (or calculation) of the voltage to be supplied to the shape memory alloy, but also the operation (or calculation) of the voltage corresponding to an electric current to be supplied to the shape memory alloy.

In the mechanism, only when the driven member should be moved in the first direction, the voltage is supplied to the shape memory alloy. As a result, the driven member is moved toward the target position. On the other hand, when the driven member should be moved in the second direction, if the result of the operation performed by the operation means becomes negative, the supply of the voltage to the shape memory alloy is prevented by the limiting circuit of the voltage supplier and thus the driven member is not further driven, nor moved. Namely, with this function, a wrong control is surely prevented, and the driven member is moved towards the target position by the biasing force exerted by the biasing device.

Therefore, according to the arrangement, the control mechanism for controlling the position of the driven member by employing the actuator which makes use of the shape memory alloy is provided Also, according to the arrangement, because the actuator is constituted by the shape memory alloy and the biasing means such as the spring, the actuator itself becomes simple in construction and compact in size. Therefore, the control mechanism having the actuator also becomes simple in construction and compact in size.

In the mechanism, it is preferable that the limiting circuit of the voltage supplier puts a limit with respect to a final output of the operation means.

According to another aspect of the present invention, there is provided a control mechanism comprising: a shape memory alloy which memorizes a predetermined dimension thereof; a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator; an operation means for performing an operation repeatedly on a basis of information upon a target position and an actual position of the driven member, and for calculating a voltage to be supplied to the shape memory alloy; and a voltage supplier having a limiting circuit for limiting a supply of the voltage, calculated by the operation means, to the shape memory alloy, when the driven member is moved in the second direction, on a basis of a result of the operation performed by the operation means.

According to still another aspect of the present invention, there is provided a control mechanism for controlling a position of a driven member in a first direction and in a second direction by an actuator, the control mechanism comprising: a target position determination means for determining a target position to which the driven member is to be moved; an actual position detection means for detecting an actual position of the driven member; and a control output operation means for calculating a control output with a phase being led (or with a phase being forwarded or with a phase being fast) by executing an operation which includes a differential calculus executed twice relative to a difference between the target position and the actual position.

By executing the operation including the differential calculus executed twice, or more than twice, relative to the difference between the target position and the actual position, it is possible to compensate a phase by 180° or more. As a result, a control with higher response is realized.

In the above mechanism, the actuator can be constituted by: a shape memory alloy which memorizes a predetermined dimension thereof; and a biasing device for exerting a biasing force on the shape memory alloy and for changing dimension of the shape memory alloy.

In the mechanism, preferably, the biasing device is a spring.

Alternatively, the actuator can be constituted by a pair of shape memory alloys one ends of which are connected to each other.

By the way, an output value (value of voltage, for example) calculated by the control output operation means is outputted to an driver for the actuator, on the basis of which the actuator is driven by the driver.

As an embodiment of the control output operation means for executing the operation which includes the differential calculus executed twice, the control output operation means can execute a PDD control.

The PDD control is a control by proportion (or proportional operation), differential calculus and differential calculus. Physically, the PDD control is of a control operation (or control calculation) carried out in view of the positional difference between the target position and the actual position, the difference in speed (or velocity), and the difference in acceleration.

Although the driven member is not particularly limited, the driven member, for example, can be an optical system for compensating a shake, caused by a manual operation, of an optical apparatus in which the control mechanism is provided.

According to still another aspect of the present invention, there is provided a control mechanism for controlling a position of a driven member in a first direction and in a second direction by an actuator, the control mechanism comprising: a target value determination means for determining a target value with which the driven member is to be moved; an actual value detection means for detecting an actual value of the driven member; and a control output operation means for calculating an optimal control output by executing leading compensations more than once relative to a difference between the target value and the actual value.

In the mechanism, the position of the driven member is controlled on the basis of the positional difference between the target position and the actual position, the difference in speed (or velocity), the difference in acceleration.

According to still another aspect of the present invention, there is provided a control mechanism comprising: a shape memory alloy which memorizes a predetermined dimension thereof; a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator; a target position determination means for determining a target position to which the driven member is to be moved; an actual position detection means for detecting an actual position of the driven member; a control output operation means for calculating a control output by executing an operation relative to a difference between the target position and the actual position; and a compensation means for restraining heating of the shape memory alloy with respect to a result of the operation executed by the control output operation means in order to stabilize a drive control of the actuator.

In the mechanism, a spring such as a bias spring can be employed.

According to the mechanism, the shape memory alloy is prevented from rather overheating by the compensation means, so that the driving characteristic (or driving property) of the actuator is stabilized.

By the way, the output value (value of voltage, for example) which is calculated by the control output operation means and which is compensated (or corrected) by the compensation means, is outputted to the driver for the actuator, on the basis of which the driver actually drives the actuator.

According to still another aspect of the present invention, there is provided a control mechanism comprising: a shape memory alloy which memorizes a predetermined dimension thereof; a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator; a target position determination means for determining a target position to which the driven member is to be moved; an actual position detection means for detecting an actual position of the driven member; a control output operation means for calculating a control output by executing an operation relative to a difference between the target position and the actual position; and a compensation means for correcting a voltage which is supplied to the shape memory alloy with respect to a result of the operation executed by the control output operation means, in which the correction of the voltage is made by adding an offset voltage.

In the mechanism, the value of the offset voltage is determined by, for example, giving a quasi shake (or false shake or pseudo shake) to the control mechanism before the control mechanism is shipped as a commercial product.

In the mechanism, it is preferable that the value of the offset voltage is negative.

According to still another aspect of the present invention, there is provided a method for adjusting servo control of a control mechanism, in which the control mechanism comprises: a shape memory alloy which memorizes a predetermined dimension thereof; a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension fag of the shape memory alloy, so as to control a position of the driven member, by the actuator; a target position determination means for determining a target position to which the driven member is to be moved; an actual position detection means for detecting an actual position of the driven member; and a servo control circuit which executes a servo control on the basis of information upon the target position and the actual position, the method comprising the steps of: optimizing a gain setting of the servo control circuit within a predetermined permissible range; detecting the actual position to which the driven member is actually driven to move, after the optimization, by the actual position detection means, and actually measuring a difference between the actual position and the target position; and making the control mechanism itself memorize the difference thus measured actually.

In the method, it is preferable that the biasing device is a spring such as a bias spring.

According to the servo control adjustment method, the difference between the actual position and the target position is actually measured, and the control mechanism itself is made to memorize the difference thus measured actually. That is, according to the method, a servo control on the basis of the difference such as an offset error etc., memorized, or stored, on the control mechanism itself, is carried out. Therefore, with the method, not only the driving condition of the control mechanism is stabilized, but also the error in the servo control becomes small (i.e. the accuracy in the servo control becomes high).

Preferably, the servo control circuit comprises a compensation circuit for restricting heating of the shape memory alloy so that a drive control of the actuator is stabilized, and the step of optimizing the gain setting thereof further comprises a step of optimizing a value of compensation which is executed by the compensation circuit.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE PREFERRED EMBODIMENT

Figure 1:
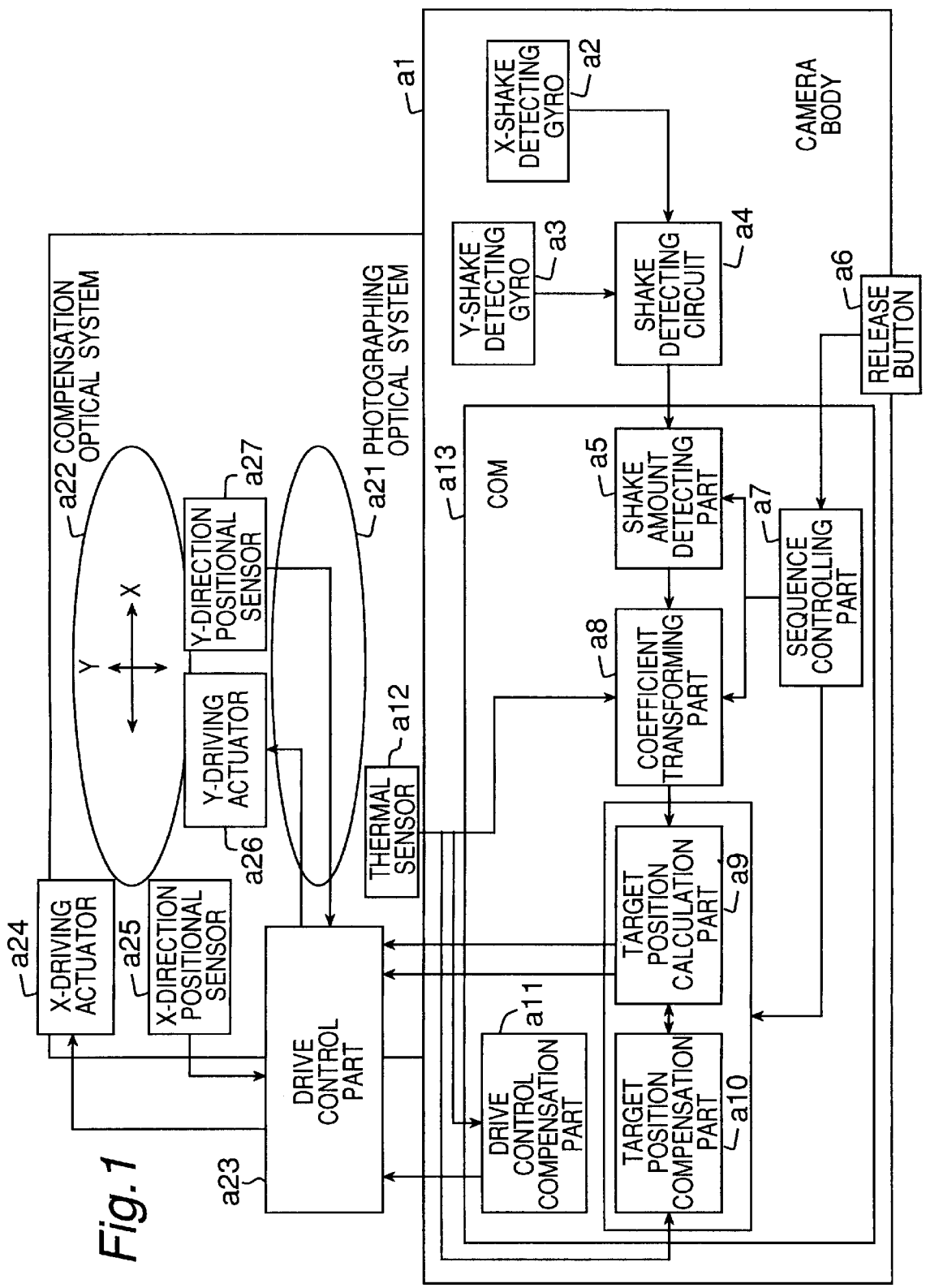
FIG. 1 is an explanatory view showing a system of a shake-compensation camera according to a preferred embodiment of the present invention.

Before the description of the preferred embodiment of the present invention proceeds, it is to be noted that like or corresponding parts or components are designated by like reference numerals throughout the accompanying drawings.

With reference to FIGS. 1 through 20, a detailed description is made below upon a camera having a function to compensate any blurred image caused by a camera shake thereof, according to a preferred embodiment of the present invention, in which a control mechanism and a servo control adjustment method of the present invention apply to the camera.

This camera detects an amount (or quantity) of a camera shake thereof caused by a user's manual operation of the camera, by-making use of a gyro (i.e. angular velocity sensor), with respect to its X-direction (i.e. horizontal direction) and the Y-direction (i.e. vertical direction), respectively. On the basis of the amount of the camera shake thereof, an optical compensation system installed inside a lens barrel of the camera is driven to move in a direction to cancel (or compensate) the camera shake thereof. The optical compensation system is driven by an actuator which employs a shape memory alloy (SMA) and a bias spring, as described later.

Generally, the camera shake is a shake having a sine wave of about 10 Hz at a maximum, and the optical compensation system installed inside the lens barrel compensates the shake.

FIG. 1 shows an overall configuration of a camera shake compensation system which includes the optical compensation system of the camera. Inside a camera body a1, there are provided a gyro for X-direction a2 and a gyro for Y-direction a3. The gyro for X-direction a2 and the gyro for Y-direction a3 detect angular velocities of the camera shake in the X-direction and Y-direction, respectively. A shake detecting circuit a4 is constituted by a filter circuit for cutting off signal noise contained in angular velocity signals which are outputted from each of the gyros a2 and a3, an integrating circuit for transforming angular velocity signals into angle signals, and so on. A shake amount detecting part a5 takes in the angle signals outputted from the shake detecting circuit a4 at a predetermined time interval, and it outputs the amount of the camera shake to a coefficient transforming part a8. The amount of the camera shake in the X-direction is outputted as "detx", and the amount of the camera shake in the y-direction is outputted as "dety".

The camera shake compensation system further includes a sequence controlling part a7 which controls a sequence for taking photographs and a sequence for compensating the camera shake. When a release button a6 is half-pressed, the preparation for photographing is started in which the preparation includes photometry and focussing. When the release button a6 is full-pressed, the camera is ready to take the photograph(s) any time, and the compensating operation is executed with the following steps of:

(1) taking in the signals from the gyros a2 and a3 into the shake amount detecting part a5 in order to detect the shake amounts of "detx" and "dety";

(2) transforming the shake amounts of "detx" and "dety" gained by the shake amount detecting part a5 into actual amounts of movements of "px" and "py" of the optical compensation system, at the coefficient transforming part a8; and (3) calculating, at a target position calculation part a9, amounts of drive signals of "drvx" and "drvy" for moving the optical compensation system by the movement amounts, or shift amounts, of "px" and "py".

By the way, the coefficient transforming part a8 calculates an optimal coefficient by taking into consideration the optical performance of the optical compensation system that varies depending on solid variations and/or temperature of the optical compensation system, when the camera is ready for photographing.

A target position compensation part a10 outputs to the target position calculation part a9 a compensation signal for compensating a target position on the basis of a signal outputted from a thermal sensor a12. This is intended primarily to perform a compensation in view of an offset amount of the actuator (hereinafter, also referred to as SMA actuator) that changes in performance with a change in temperature. In the embodiment illustrated, the target position calculation part a9 serves as a target position determination means.

A drive control compensation part a11 optimizes its driving state by setting an optimum gain so that an optimum drive performance can be exhibited at various solids and various temperatures, independently of the SMA actuator, solid variations of the drive mechanism and variations in drive performance due to temperature. These processes are digitally executed by a microcomputer.

The optical compensation system a22 is provided in a photographing optical system a21, as shown in the figure. The optical compensation system a22 is driven in X- and Y-directions by an X-direction actuator a24 and a Y-direction actuator a26, respectively, independently of each other. An X-direction position and a Y-direction position of the optical compensation system a22 are detected by positional sensors a25, a27, respectively. Mechanical constructions of these devices are explained below.

Figure 2:
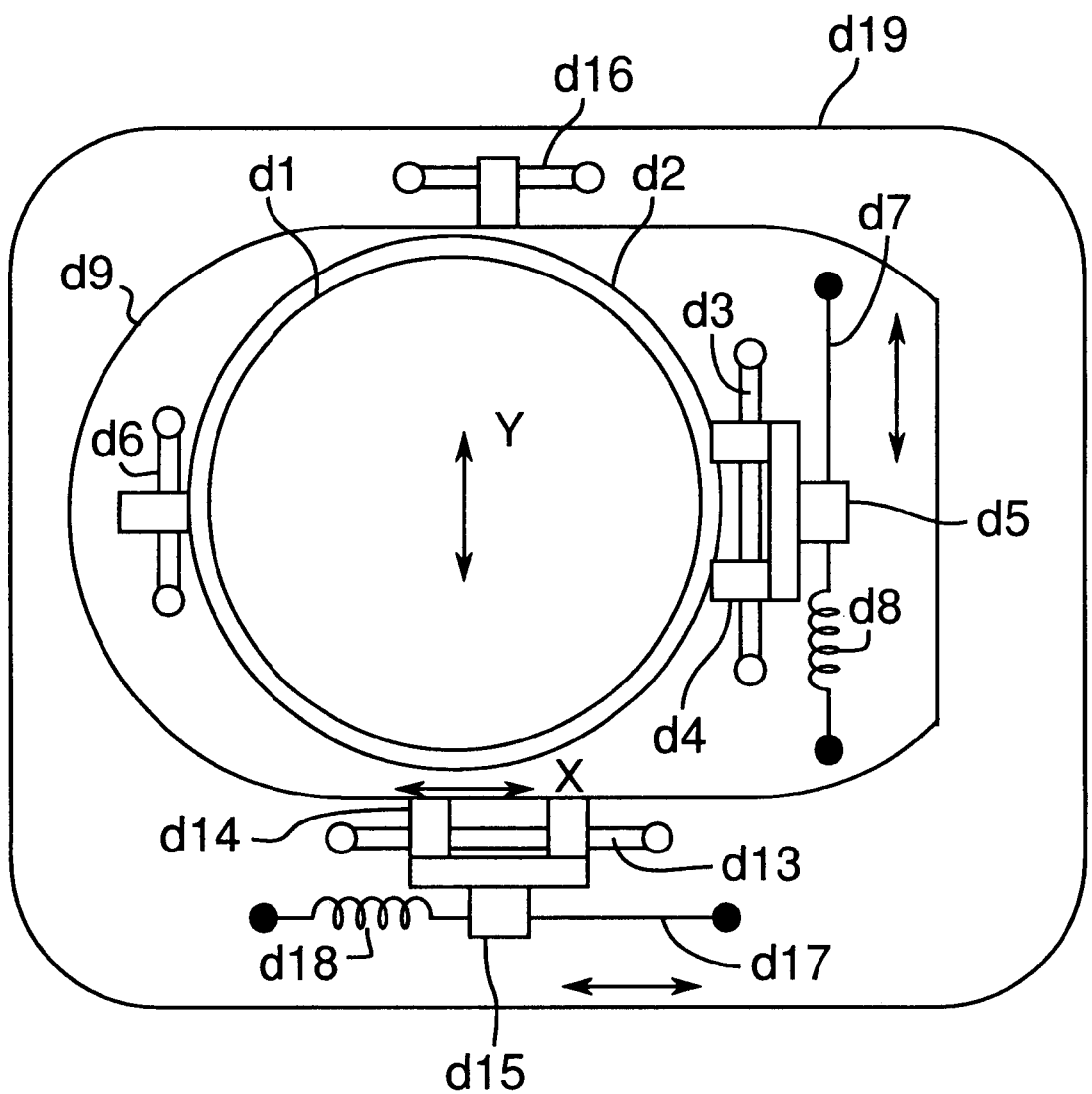
FIG. 2 is a schematic view showing a drive mechanism of an optical compensation system of the camera of FIG. 1.

FIG. 2 is a plan view for explaining the drive mechanism of the optical compensation system. A slidable base d9 is slidable in the X-direction relative to a stationary base d19 which is immovably fixed to the camera body. The optical compensation system d1 is slidable in the Y-direction relative to the slidable base d9. Accordingly, the optical compensation system d1 is slidable in both X- and Y-directions relative to the stationary base d19.

The slide mechanism of the optical compensation system d1 relative to the slidable base d9 is as follows. That is, two guide rods d3 and d6 extending in the Y-direction are fixed on a top face of the slidable base d9, and the optical compensation system d1 is placed between the two guide rods d3 and d6. A holding frame d2 of the optical compensation system d1 has a pair of slide guides each of which slidably engages with each of the pair of guide rods d3 and d6. Accordingly, the optical compensation system d1 is slidable in the Y-direction with its being guided by two guide rods d3 and d6. On a terminal d5 protruding from one d4 of the slide guides, an SMA d7 and a bias spring d8 are provided so as to mutually pull up the terminal d5.

Initially, a force of tension exerted by the bias spring d8 is larger than a force of tension exerted by the SMA d7. Therefore, the optical compensation system d1 is positioned on the under side in FIG. 2. If the amount of electric current supplied to the SMA d7 is increased from that state shown in the figure, the SMA d7 gradually contracts towards its memorized length, thus causing the optical compensation system d1 to move upward in the figure. Accordingly, the position of the optical compensation system d1 can be controlled relative to the Y-direction by controlling the amount of electric current supplied to the SMA d7.

Also, the positional control of the slidable base d9 in the X-direction relative to the base d19 is executed on the basis of the same principle and the same construction as those aforementioned. In FIG. 2, a reference numeral d13 corresponds to d3, d16 to d6, d14 to d4, d15 to d5, d17 to d7, and d18 to d8.

Namely, there are provided the two separate actuators in the X- and Y-directions, independently of each other, and each of the two actuators has the shape memory alloy d7, d17 and the bias spring d8, d18.

In the above embodiment, the positional control of the optical compensation system d1 relative to the stationary base d19, is carried out by a balance of tension exerted between the SMA d7, and the bias spring d8, d18 in each of the X- and Y-directions. As a modification to the embodiment, it is possible to provide a pair of SMAs in each of the X- and Y-directions, and to carry out the positional control of the optical compensation system by a balance of tension exerted between the pair of SMAs in each of the X- and Y-directions.

Figure 3:
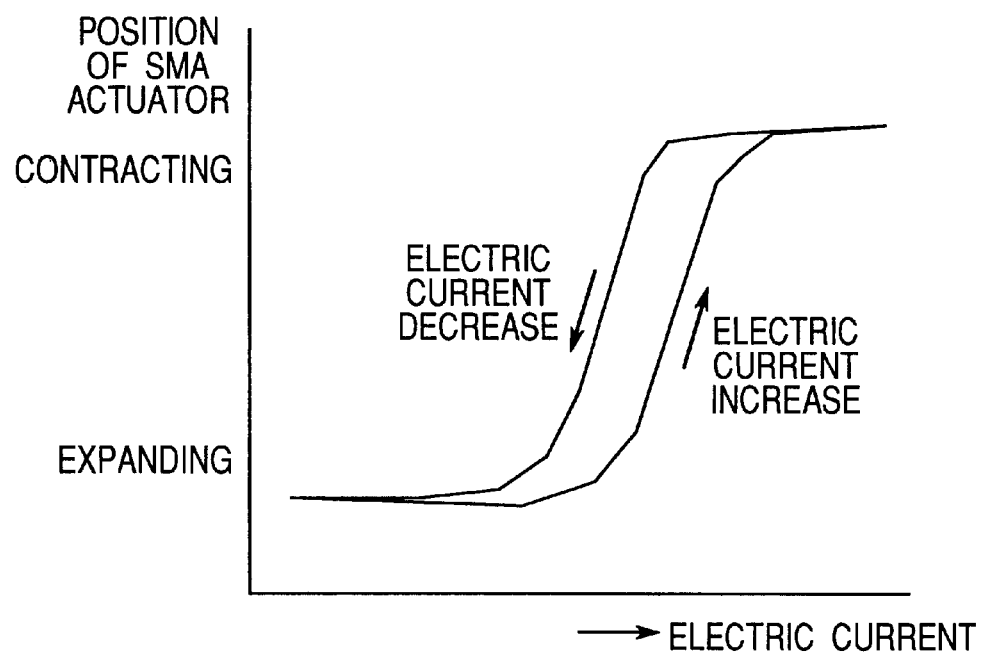
FIG. 3 is a graph showing a characteristic of a shape memory alloy employed for the drive mechanism of FIG. 2.

FIG. 3 shows a hysteresis loop representing expansion and contraction of the SMA versus electric current applied to the SMA. Because the SMA is soft and easily deformable when the temperature is lower than the temperature of memory, the SMA is expanded by being pulled by the bias spring. On the other hand, when the SMA is heated to the temperature of memory, the SMA returns to its original, memorized shape or dimension. That is, the SMA can be expanded and contracted by decreasing and increasing the temperature, by switching "ON" and "OFF" the electric current which is supplied to the SMA.

Figure 4:
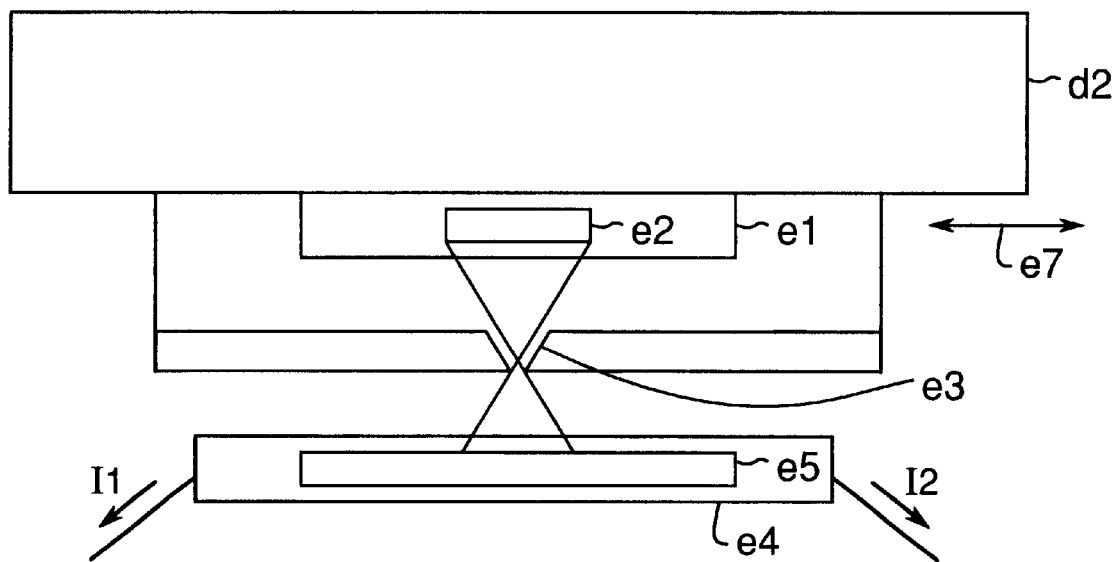
FIG. 4 is a schematic view explaining a principle of detecting position of the optical compensation system in the drive mechanism of FIG. 2.

FIG. 4 is an explanatory view for explaining a positional detecting mechanism and for explaining a principle of detecting the present position of the optical compensation system with the positional detecting mechanism.

As shown in the figure, an LED e1 is fixed to the holding frame d2 of the optical compensation system d1 (see FIG. 2). Accordingly, the LED e1 moves along with the optical compensation system d1. Light emitted from a light-emitting chip e2 of the LED e1, passes through a slit e3, and reaches a light-receiving part e5 of a PSD (position sensitive device) e4. The PSD e4 is stationary (i.e. immovable) relative to the camera body. Therefore, when the optical compensation system d1 moves relative to the camera body, the barycentric position of light on the light-receiving part e5 also moves. As a result, a ratio of electric currents I1 to I2 outputted from the PSD e4 changes, and it is possible to detect the position of the optical compensation system d1 relative to the camera body by measuring this ratio.

The slit e3 is tapered so that it is wider on a side of the light-emitting LED e1 and it is narrower on a side of the light-receiving PSD e4. Because of this construction thereof, its directivity is increased with the energy loss being prevented. As shown in FIG. 4, the slit e3 extends in a direction perpendicular to a direction of detection (i.e. refer to an arrow designated by a reference numeral e7 in the figure) in which the optical compensation system d1 moves or shifts. Accordingly, in the embodiment shown in FIG. 4, the sensitivity is higher with respect to the movement of the optical compensation system d1 in the direction designated by the arrow e7, and the result of the detection is not affected by any movement in the direction perpendicular to the direction in which the optical compensation system moves.

There are provided a pair of positional detection mechanisms each of which is constructed as the positional detection mechanism as explained above with reference to FIG. 4 in which the pair of positional detection mechanisms are separate from each other (i.e. independent of each other), for the purpose of independently detecting the X-direction and the Y-direction of the optical compensation system d1.

Figure 5:
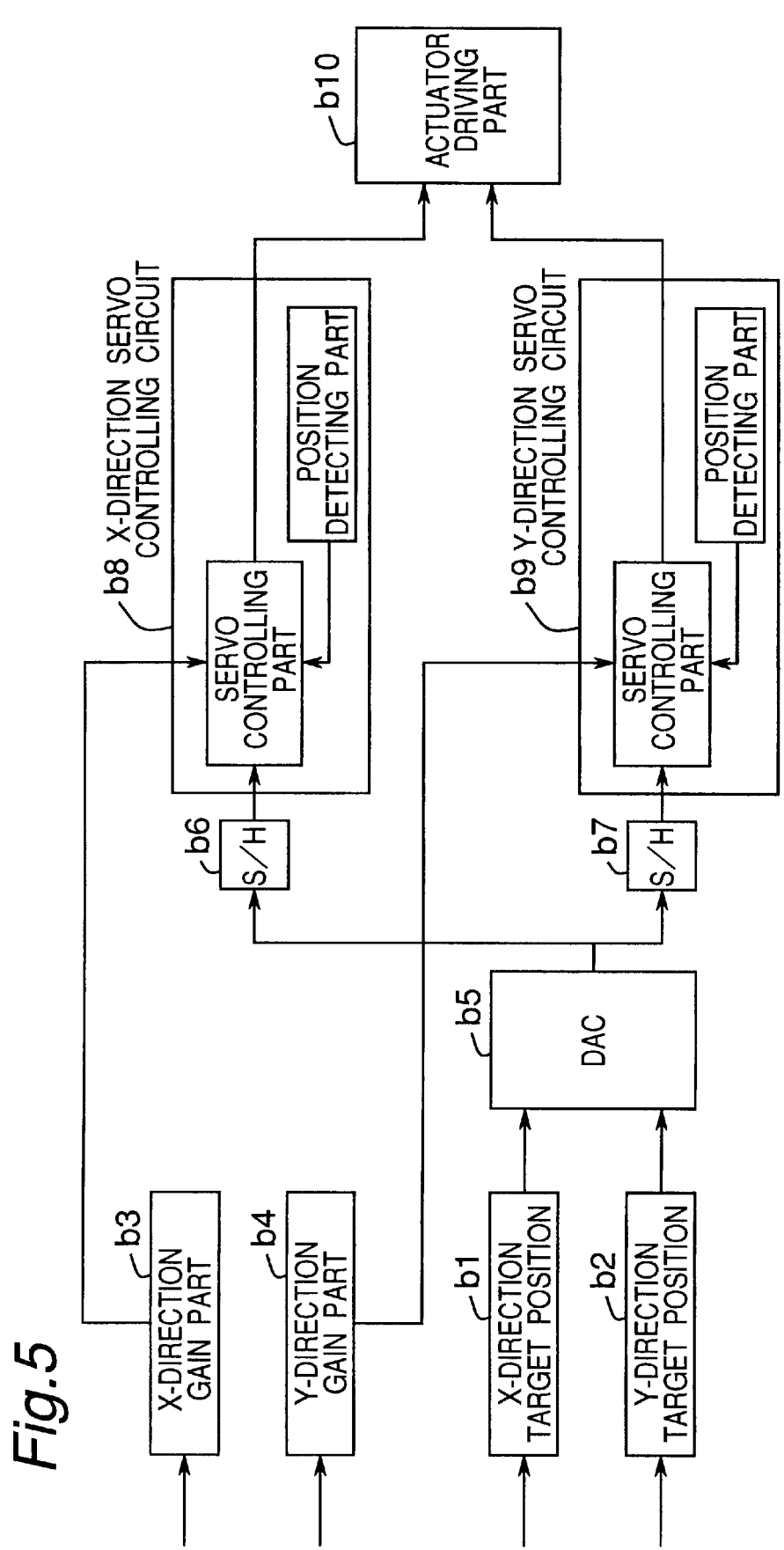
FIG. 5 is a view showing a mechanism of a drive control part in the system of FIG. 1.
Figure 6:
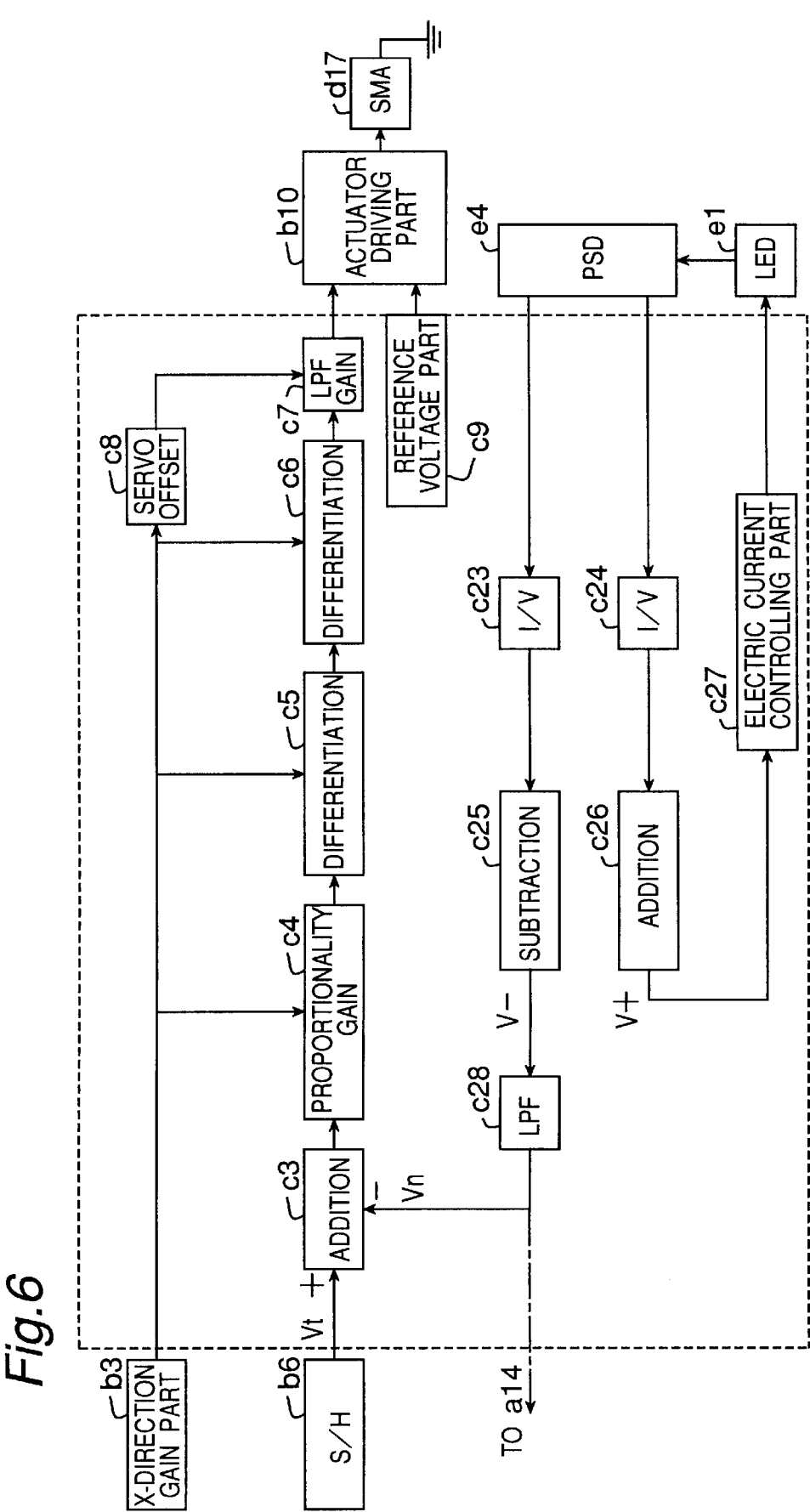
FIG. 6 is a view showing a circuit of a servo controlling part of FIG. 5.

Next, with reference to FIGS. 5 and 6, it is explained about a drive control part a23 (refer to FIG. 1).

FIG. 5 shows a general construction of the drive control part a23. This drive control part a23 has: data receiving parts (b1–b4), a D/A converter b5, a X-direction servo controlling part (b6, b8), a Y-direction servo controlling parts (b7, b9) and an actuator driver b10.

More specifically, a reference numeral b1 designates a data receiving part of the target position in the X-direction, for receiving and storing target position signals outputted from the target position calculation part a9, and a reference numeral b2 designates a data receiving part of the target position in the Y-direction, for receiving and storing target position signals outputted from the target position calculation part a9. On the other hand, a reference numeral b3 designates a data receiving part of gain data in the X-direction, for receiving and storing signals outputted from the drive control compensation part a11, and a reference numeral b4 designates a data receiving part of gain data in the Y-direction, for receiving and storing signals outputted from the drive control compensation part a11. On the basis of the gain data stored thereon, gains are set in the servo circuit. Next, it is explained about the servo control.

When the X-direction is selected by an X/Y direction selecting circuit, the data on the target position in the X-direction is outputted from the target position calculation part a9 and is stored on the data receiving part b1. This data is converted from digital to analog form by the D/A converter b5. When this conversion is carried out, the sample-hold circuit b6 comes into a sampling state, and an output from the D/A converter b5 is supplied to the X-direction servo controlling circuit b8 as a target position voltage. Meanwhile, the sample-hold circuit b7 has come into a holding state.

At the next timing, the Y-direction is selected by the X/Y direction selecting circuit in order to set the target position in the Y-direction. Then, in the same manner as above, an output from the D/A converter b5 is supplied to the Y-direction servo controlling circuit b9 as a target position voltage. In this manner, data on the targets in the X-direction and Y-direction are repeatedly outputted alternately.

The X-direction servo controlling circuit b8 and the Y-direction servo controlling circuit b9 have mechanisms (or constructions) similar to each other. Therefore, it is explained about only the X-direction servo controlling circuit b8 below.

As shown in FIG. 5, the X-direction servo controlling circuit b8 has a servo controlling part and a position detection part. The servo controlling part serves as a control output operating means, and it is shown in detail within a broken line in FIG. 6.

That is, as aforementioned, a voltage Vt corresponding to a target value (or target position) is inputted from the sample-hold circuit b6 to the servo controlling part. Meanwhile, a voltage corresponding to a present position (i.e. current position or actual position) in the X-direction is generated by the position detection part in the following manner.

Namely, the PSD e4 outputs the electric currents I1, I2 when the PSD e4 receives the light emitted from the LED e1 (see FIG. 4). The electric currents I1, I2 thus outputted are converted into voltages by I/V (current/voltage) converter circuits c23 and c24, respectively. The values of the resulting voltage are subjected to a subtracting operation by a subtraction circuit c25 and to an adding operation by an addition circuit c26. The value of the voltage gained in the addition circuit c26 is transmitted to an electric current controlling part c27, where a control to keep the sum of the values of the voltages constant is carried out. With the sum thereof being kept constant, it becomes possible to detect the position of the optical compensation system d1 by monitoring the output from the subtraction circuit c25. The output from the subtraction circuit c25, by being passed through a low-pass filter ("LPF" in the figure) c28, has any high-frequency noise cut off, so that a voltage Vn corresponding to the current position (i.e. present position or actual position) in the X-direction of the optical compensation system d1 is outputted.

The circuit c3 in which operation of addition is carried out, performs a subtraction between the target position corresponding voltage Vt and the current position corresponding voltage Vn. Because the current position corresponding voltage Vn becomes a negative value, the subtraction can be achieved by the addition circuit which performs an operation of addition. A proportional gain circuit c4 sets a gain of the difference between the target position and the current position (i.e. present position).

The servo controlling part includes a pair of differential calculus circuits c5 and c6. Each of the differential calculus circuits c5 and c6 carries out a 90° phase-lead compensation. By performing the differential calculus twice through the circuits c5 and c6, it is possible to achieve a 180° phase-lead compensation. Using all of the circuits c4–c6 allows a PDD control, as it is referred to in the control theory, to be executed. By combining these circuits with each other, various gains corresponding to gain data setting values in the X-direction gain part b3 can be obtained. That is, even if there exists a solid variation in the drive mechanism part, it can be absorbed. Further, with these circuits, any effect (or influence) caused by a change in temperature can be compensated.

A servo offset circuit c8 adjusts the offset voltage of the servo circuit so as to remove any effect caused by the solid variation(s) and temperature(s), thereby optimizing the driving state. A circuit c7 performs a converting operation of final voltage gain and an operation to remove any high-frequency noise. In the embodiment illustrated, the circuits c3 to c8 constitute an applied voltage operating means. A reference voltage part c9 outputs a reference voltage to an actuator driving part b10. The actuator driving part b10 supplies to an SMA (i.e. shape memory alloy) d17 a voltage which is proportional to an inputted voltage. In the embodiment, however, any voltage is not supplied to the SMA when the value of Vin–Vref becomes negative.

Figure 7:
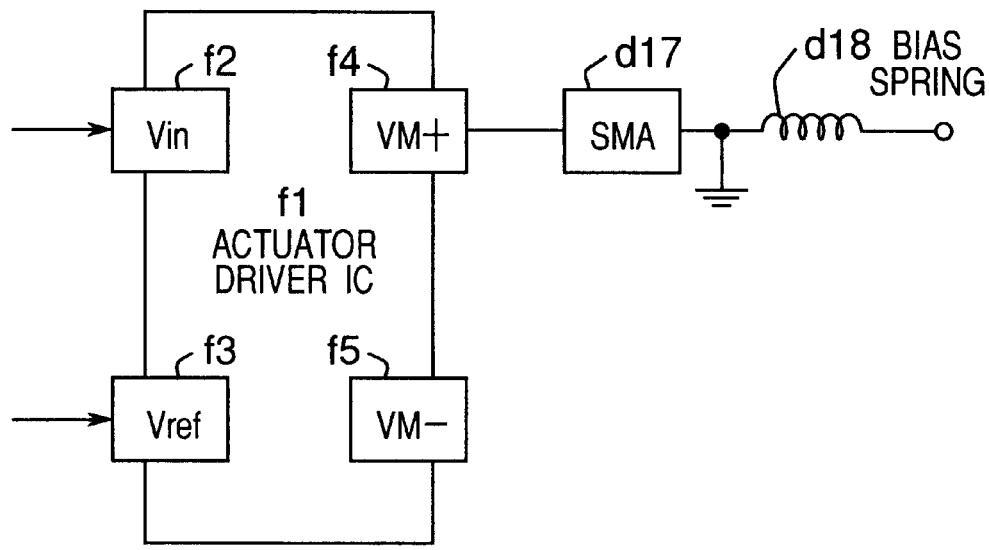
FIG. 7 is a view explaining a driver IC of an actuator driving part shown in FIG. 6.
Figure 8:
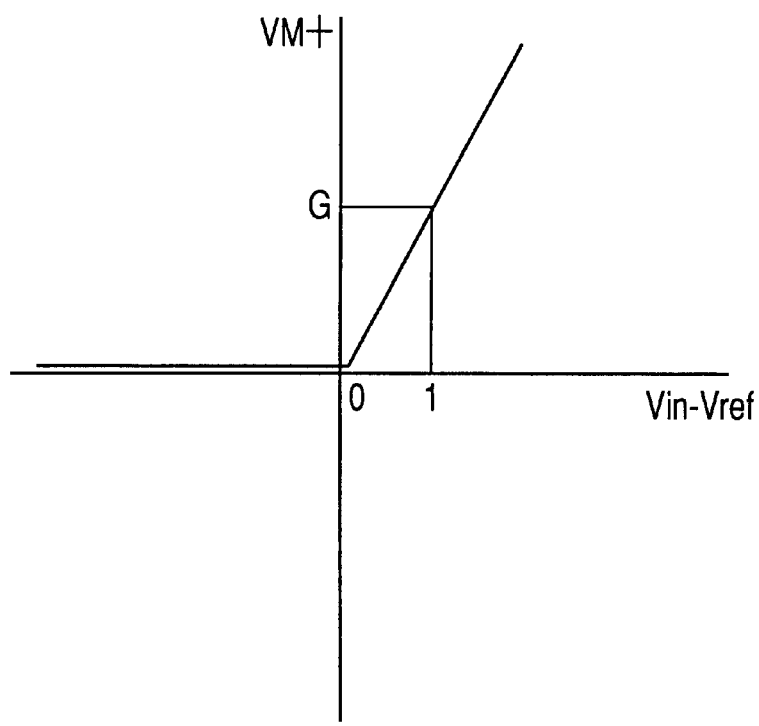
FIG. 8 is a graph showing output characteristics of the driver IC of FIG. 7.

FIG. 7 shows a state of connection of a driver IC in the actuator driving part b10, and FIG. 8 shows its output characteristics. A Vin terminal f2 receives an input from the circuit c7 in FIG. 6. A Vref terminal f3 receives an input from the reference voltage part c9 in FIG. 6. In a comparison between an input value from the Vin terminal f2 and an input value from the Vref terminal f3, when Vin–Vref results in a positive value, a drive voltage is supplied from a VM+ terminal f4 to the SMA d17. As a result, the SMA d17 contracts in such a direction that a bias spring d18 is expanded. Meanwhile, a VM– terminal f5 is not connected to external. Therefore, when Vin–Vref results in a negative value, no voltage is supplied to the SMA d17. Under this condition, the SMA d17 is expanded by the spring force of the bias spring d18. In the embodiment illustrated, the actuator driving part b10 serves as a voltage supplying means (or voltage applying means), and the driver IC corresponds to a limiting circuit therefor.

As explained above, a positive value of Vin–Vref causes the output of the actuator driver IC to be proportional to the value of Vin–Vref, and a negative value of Vin–Vref causes the output of the actuator driver IC to be zero. This is graphed in FIG. 8.

As a modification to the embodiment, the circuit. may be constructed so that: when a value of signal from the circuit c7 is higher than Vref, the value of the voltage is directly supplied to the actuator driving part b10, and when the value of signal from the circuit c7 is lower than Vref, the application (or supply) of the output itself to the actuator driving part b10 is stopped.

As another modification to the embodiment, the circuit may be constructed so that: when a value of Vin–Vref is negative, the circuit within the driver IC inside the actuator driving part b10 limits the output by GND.

In any case, the final output to the actuator driving part b10 is limited as aforementioned.

As explained above, a terminal of the linear output driver IC is connected to only one end of the SMA, and a voltage is applied thereto only when the value of Vin–Vref is positive. Therefore, the circuit construction of the driver IC can be simplified.

Figure 9:
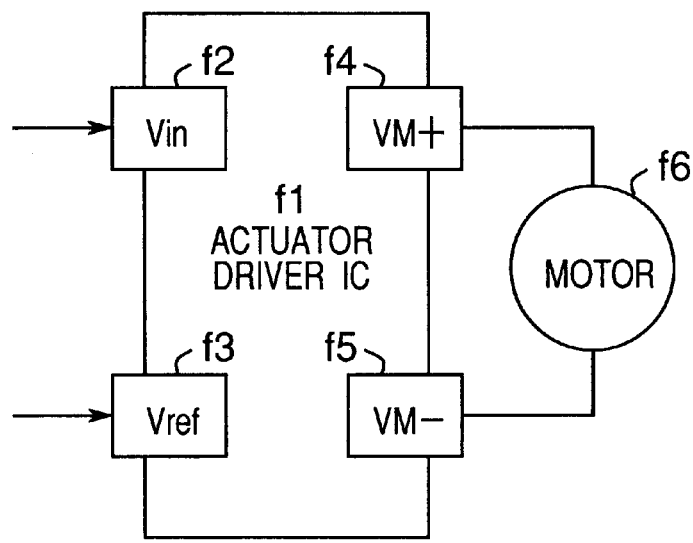
FIG. 9 is an explanatory view showing an example according to prior art, in which a motor is employed as an actuator.
Figure 10:
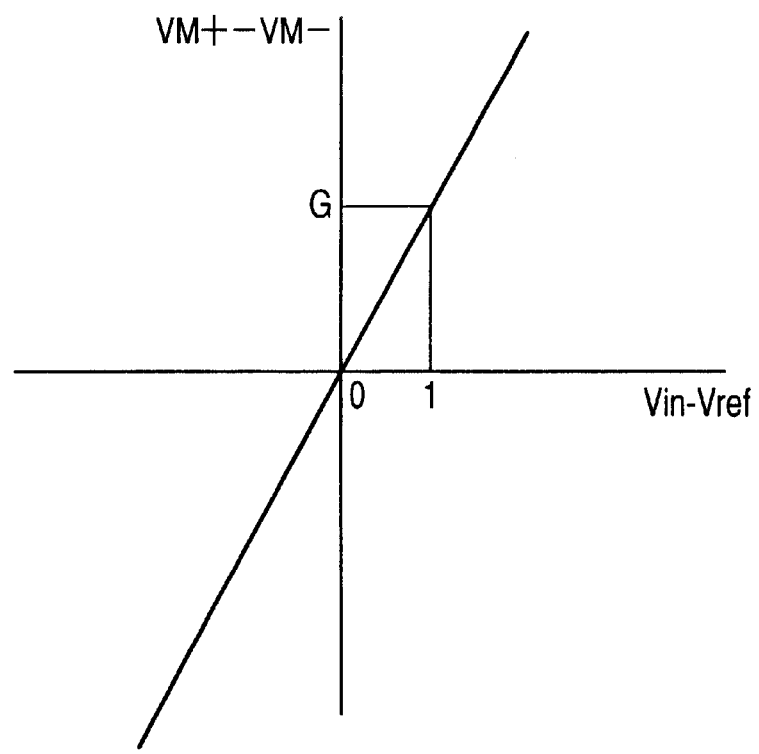
FIG. 10 is a graph showing output characteristics of the driver IC of FIG. 9.

Next, in contrast therewith, with reference to FIGS. 9 and 10, it is explained about an arrangement in which a motor, as has conventionally been used, is used, although it becomes large-sized as an actuator.

That is, FIGS. 9 and 10 show a relation of connection between a driver IC (f1) and a motor (f6) where both VM+ terminal f4 and VM– terminal f5 are connected to the motor f6 in order to drive the optical compensation system. FIG. 9 shows a state of the connection therebetween, and FIG. 10 shows an output characteristics of the driver IC (f1). As shown in FIG. 9, unlike the preferred embodiment, the VM– terminal f5 is connected to the actuator which is the motor f6. Also, as shown in FIG. 10, even when the value of Vin–Vref is negative, an output is provided from the VM– terminal f5. If the motor f6 is replaced by the SMA in the arrangement of FIG. 9, the SMA is contracted, even when it is desired to drive the optical compensation system d1 in the direction in which the bias spring is contracted or shrunk. Thus, it is not possible to drive the optical compensation system d1 properly with the arrangement. The contrast in arrangement between this example and the embodiment makes the present invention clear.

By the way, if the general-purpose driver IC as shown in FIGS. 9 and 10 is employed, and if the connection to the VM– terminal f5 is not employed, the general-purpose driver IC (f1) can be employed in the actuator driving part b10 of the embodiment as shown in FIG. 7.

As a modification thereto, it is possible to make and use a positive-output linear driver circuit which has the output characteristics shown in FIG. 8.

The actuator employing the shape memory alloy (SMA) d17 and the bias spring d18, controls the position of a driven member which the actuator drives or moves, in accordance with a principle of:

(A) applying (or supplying) an electric current to the SMA, (B) heat being generated, (C) tension being exerted, (D) acceleration being given, (E) velocity being given, and (F) desired position of the driven member gained.

In a process of (A) to (B), there exists a 90° phase lag (or 90° phase retardation or 90° phase lateness); in a process of (D) to (E), there exists a 90° phase lag; and in a process of (E) to (F), there exists a 90° phase lag. Therefore, there exists a 270° phase lag in total (i.e. there exist a first 90° phase lag, a second 90° phase lag and a third 90° phase lag).

Next, with reference to Bode diagrams of FIGS. 11 to 13A and 13B, it is explained about effects realized by performing PDD (proportional+differential+differential) control by making use of the servo circuit of the servo controlling part shown in FIG. 6.

Figure 11:
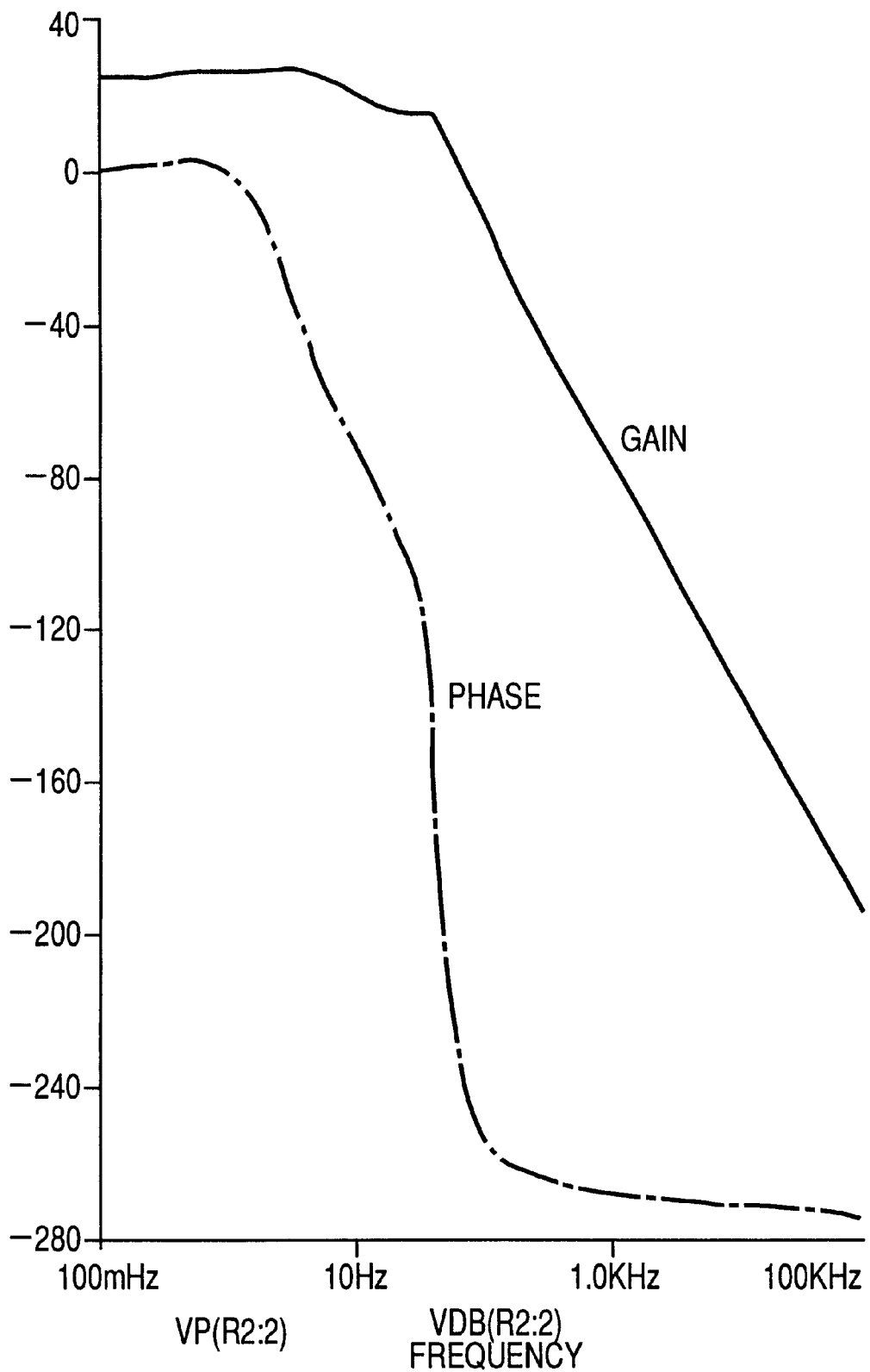
FIG. 11 is a Bode diagram showing a result of actual measurement of response to frequency of an actuator model which is constituted by the shape memory alloy and a bias spring.

Namely, firstly, a model of actuator which employs a shape memory alloy and a bias spring was made, and, secondly, its nature of responsive to frequency was actually measured. The result of the nature of responsive thereto is shown in FIG. 11. As shown in FIG. 11, there arises a phase lag of about 270° with the frequency being higher than 70 Hz. As a result, if executing the servo control, only a compensation to absorb the 90° phase lag by differential calculus results in causing a resonance. In order to suppress this resonance, it is necessary to carry out differentiation control. However, generally, only a phase advance of 90° is allowed per differential calculus. Therefore, from FIG. 11, it is predicted that to execute the differentiation only once is not enough, and that it is necessary to execute the differential calculus twice, in order to make the phase lag satisfactorily smaller than 180°. The reasonability of this prediction is verified with reference to FIGS. 12A, 12B, 13A and 13B.

Figure 12A:
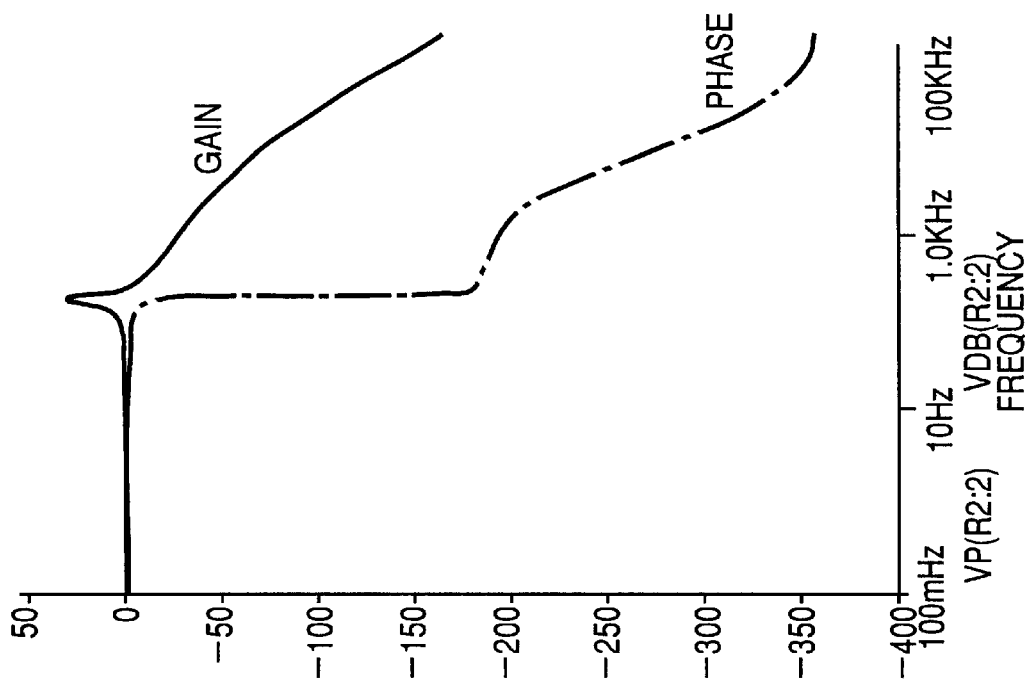
FIG. 12A is a Bode diagram showing open characteristics of the model of FIG. 11 when a PD control is executed with respect to the model.
Figure 12B:
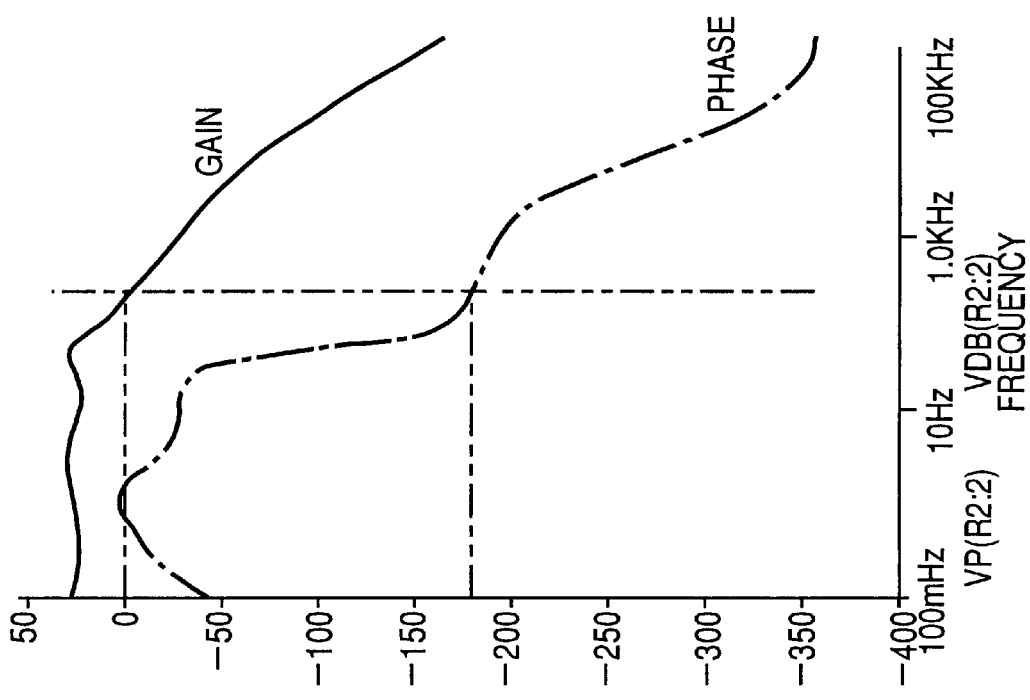
FIG. 12B is a Bode diagram showing feedback characteristics of the model of FIG. 11 when the PD control is executed with respect to the model.

FIG. 12A shows open characteristics (characteristics without feedback) in a case that a PD (proportional+ differential) control is performed in contrast with the characteristics of the model of actuator of FIG. 11. From FIG. 12A, it can be understood that there is neither phase margin nor gain margin. In contrast with this, if the feedback control is performed as shown in FIG. 12B, a resonance occurs at frequencies somewhat smaller than 1.0 kHz. Namely, better control characteristics cannot be realized by the 90° phase compensation only.

Figure 13A:
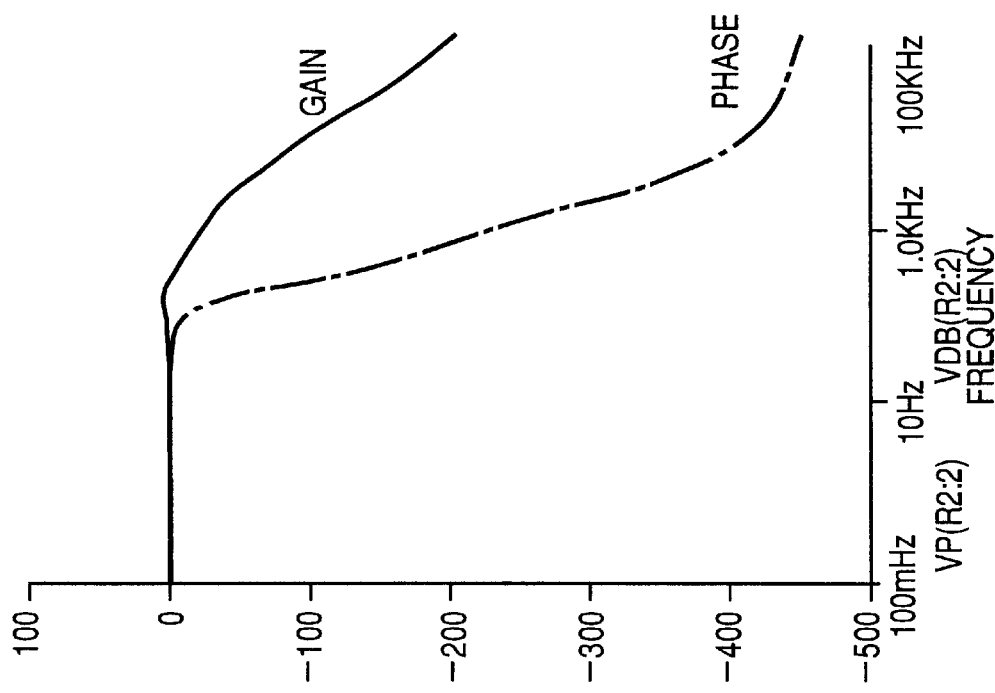
FIG. 13A is a Bode diagram showing open characteristics of the model of FIG. 11 when a PDD control is executed with respect to the model.
Figure 13B:
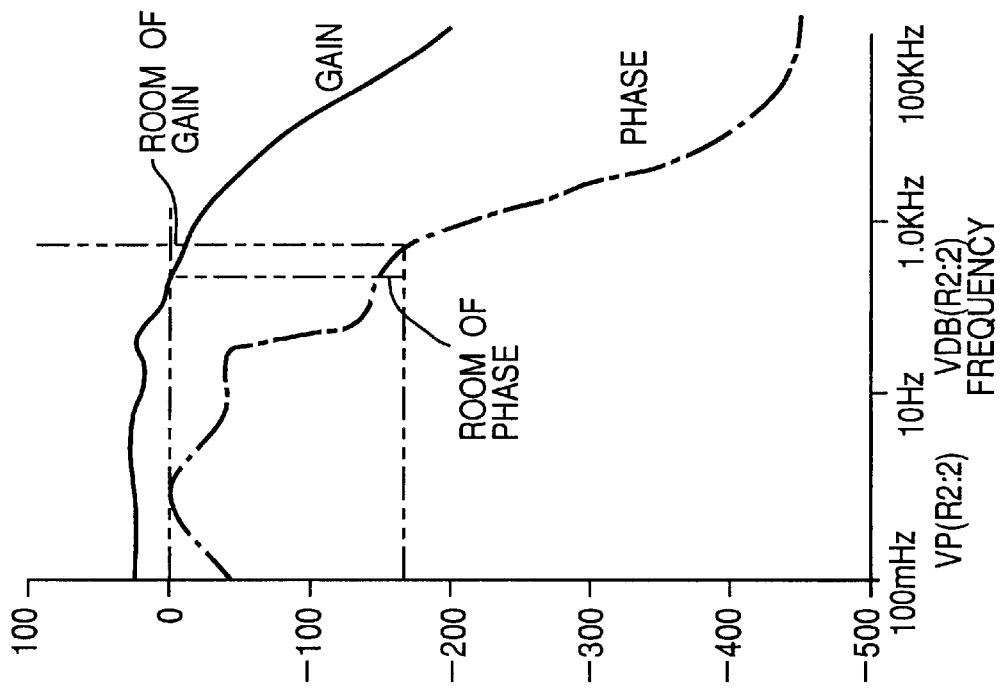
FIG. 13B is a Bode diagram showing feedback characteristics of the model of FIG. 11 when the PDD control is executed with respect to the model.

In contrast, FIG. 13A shows open characteristics in a case that a PPD (proportional+differential+differential) control is performed. Different from the case of FIG. 12A, a phase margin and a gain margin are obtained. In contrast, FIG. 13B shows a nature (or property) of response to frequency in a case that the feedback control is performed. As can be seen from the figure, there is no occurrence of such a resonance as seen in FIG. 12B.

Next, with reference to FIG. 14 and so on, the description is made below upon the camera according to a modification to the preferred embodiment of present invention.

The description is made by focussing upon any difference from the embodiment, because the camera according to the modification has a basic construction (or mechanism) similar to that of the aforementioned preferred embodiment.

Figure 14:
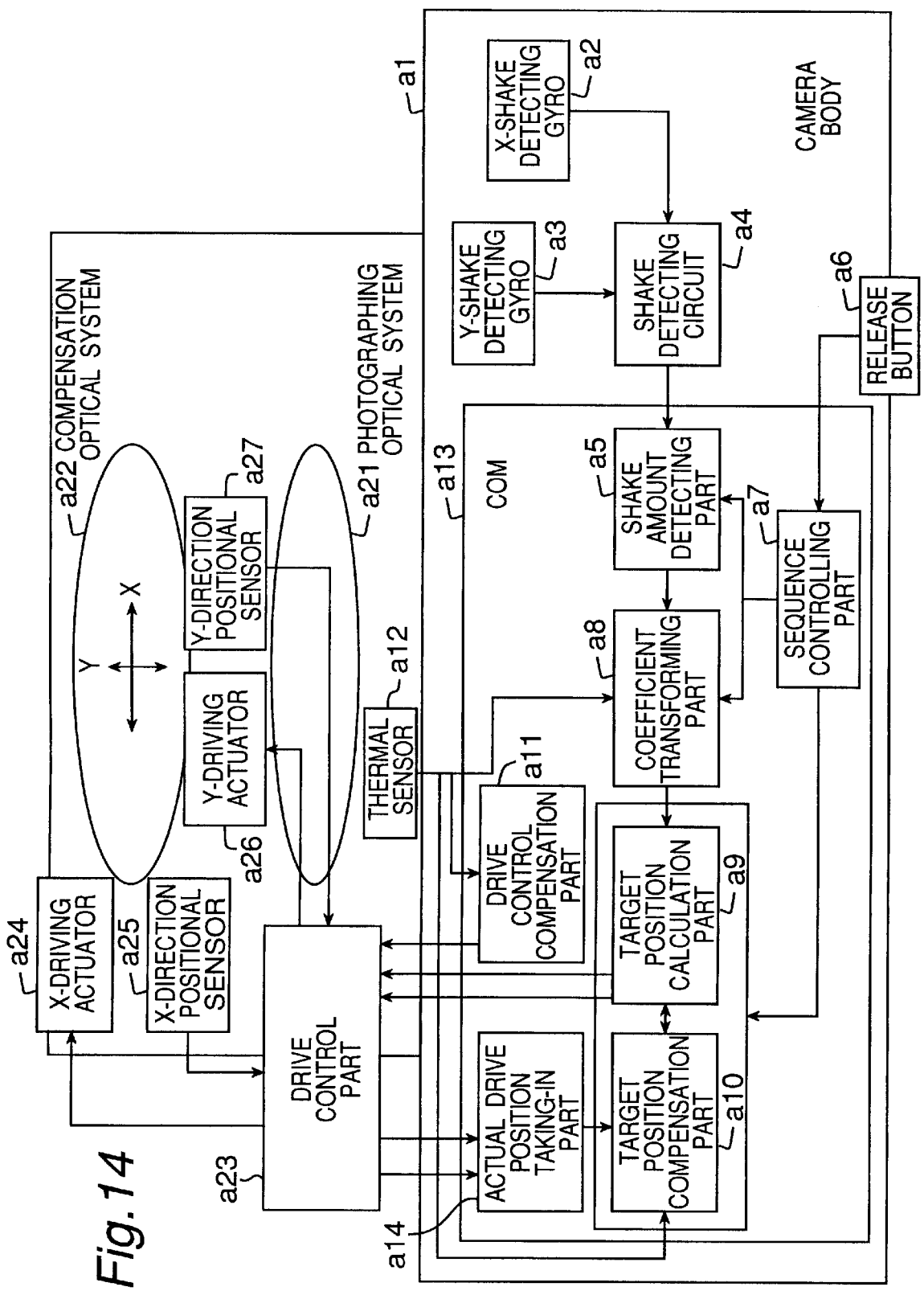
FIG. 14 is an explanatory view showing a system of the shake-compensation camera according to a modification to the embodiment.

That is, FIG. 14 shows an overall configuration of a camera shake compensation system which applies to the camera of the modification. The overall configuration of the camera shake compensation system of the modification is similar to that of the aforementioned embodiment. However, the former differs from the latter in that there is additionally provided an actual position taking-in part a14.

More specifically, a reference numeral a10 designates the target position compensation part which outputs a compensation signal for compensating (or correcting) the target position thereof on the basis of signals outputted from the thermal sensor a12 and the actual drive position taking-in part a14. The actual drive position taking-in part a14 receives signals indicating the current position (i.e. present position or then position or actual position) of the optical compensation system from the position detecting sensors a25, a27 (i.e. the sensor a25 for detecting position in the X-direction, and the sensor a27 for detecting position in the Y-direction) mounted on a side of the lens barrel, and the actual drive position taking-in part a14 then outputs the signals to the target position compensation part a10. Based on the signals, the target position compensation part a10 performs any necessary compensation in view of offset error of the SMA (i.e. shape memory alloy) actuator, the performance of which changes as the temperature increases.

In this modification, the target position calculation part a9 serves as a target position determining means. The drive control compensation part a11 sets an optimal gain so as to realize optimal driving performance with respect to each solid and each temperature, and so as not to be affected by the nature of SMA actuator, solid variations of the drive mechanism, and change in driving performance due to temperature. That is, the drive control compensation part all optimizes the state of drive. The aforementioned operation is digitally processed by a microcomputer, which is the same as that of the aforementioned embodiment.

In the embodiment and modification, signals from the low-pass filter (LPF) c28, as shown in FIG. 6, is transmitted to the circuit c3 where the operation of addition is performed. And when the offset error is actually measured as explained later, the signals from the low-pass filter (LPF) c28 are also transmitted to the actual drive position taking-in part a14 (refer to FIG. 14) which is on a side of the camera body. By the way, the path of the signal transmitted from the low-pass filter c28 to the actual drive position taking-in part a14, is shown by an imaginary line and arrow in FIG. 6.

The servo offset circuit c8 (refer to FIG. 6) applies an offset voltage to a final gain which is obtained through the individual circuits c4–c6, so that the SMA is prevented from being rather overheated. As a result, the property (or characteristic) of the servo drive is stabilized. That is, the circuit c8 serves as a compensation means; the circuit c7 performs a conversion of a final voltage gain and it removes noise of high-frequency; and the reference voltage part c9 supplies a reference voltage (or standard voltage) to the actuator driving part b10. The actuator driving part b10 supplies to the SMA d17 a voltage proportional to the voltage which is inputted to the actuator driving part b10. In the arrangement, when the value of Vin−Vref becomes negative, the voltage is not applied to the SMA.

Next, with reference to FIGS. 15 through 20, it is explained about effects (merits and advantages) realized by the provision of the servo offset circuit c8 (refer to FIG. 6) of the camera.

Figure 15:
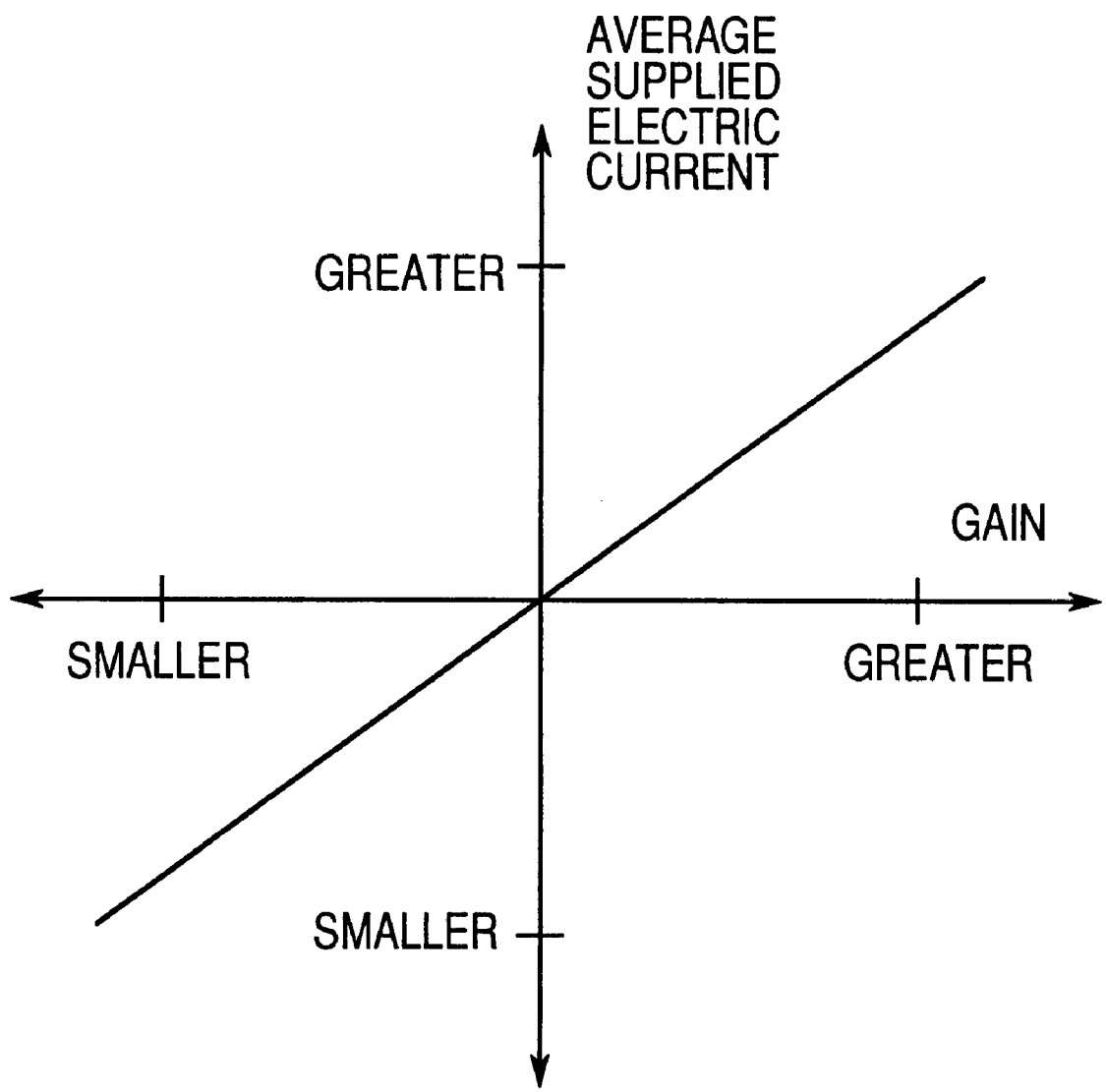
FIG. 15 is a graph showing a relation between magnitude of set gain and applied electric current.

As shown in FIG. 15, as the value of the gain setting is greater, the mean electric current (i.e. average applied electric current) applied for a predetermined time corresponding to a shift, or deviation, relative to a target position is greater. That is, if the actuator is of a type in which the shape memory alloy is employed, there arises a problem that the servo control becomes unstable when the shape memory alloy becomes rather overheated. According to the embodiment of the present invention, however, this problem is resolved by making use of the offset voltage.

Namely, a negative offset voltage is added to a final gain obtained through the proportional gain circuit c4 and the differential calculus gain circuits c5, c6 shown in FIG. 6, so that the value of the mean voltage (or average voltage) applied to the shape memory alloy (i.e. SMA) is made smaller than the value of the mean voltage (or average voltage) determined by the operation (or calculation) of PPD. As a result, the shape memory alloy can be prevented from being overheated. In a case that the servo control is performed by using an actuator which is constituted by the shape memory alloy and the bias spring, if the gain is increased in order to enhance the performance of the servo drive (i.e. in order to reduce any error between a target position and an actual position), the mean applied voltage (or average supplied voltage) also increases. As a result, the driving condition becomes unstable, and the error in the positional offset also changes. More specifically, when the gain increases, the instability also increases and the mean drive position (or average driving position) shifts towards a direction in which the shape memory alloy contracts.

In order to execute an optimum drive control with the actuator system, it is desirable to realize the optimum drive control by taking the procedures of:

(1) setting a control state in which the drive is stable and causes less vibration (i.e. less tremor) on the basis of the "gain by proportion and differential calculus" and "offset voltage" (it is to be noted that the positional offset error still remains at this stage); and (2) detecting the remaining positional offset error, making the camera memorize the error, and performing the positional control in which the positional offset error has been taken into account in advance.

Figure 16A:
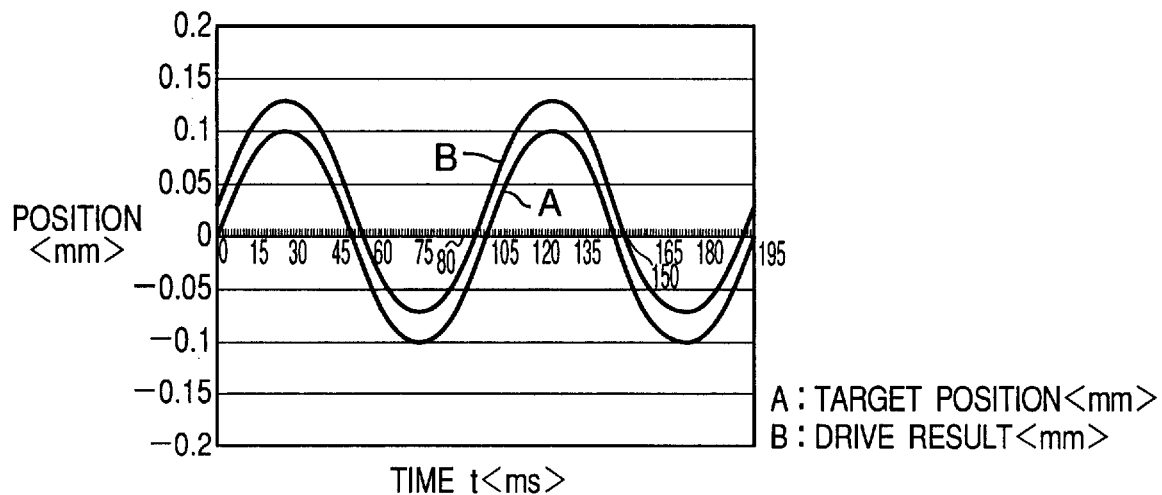
FIG. 16A is a graph explaining a relation between target position and drive result when offset voltage is not applied.
Figure 16B:
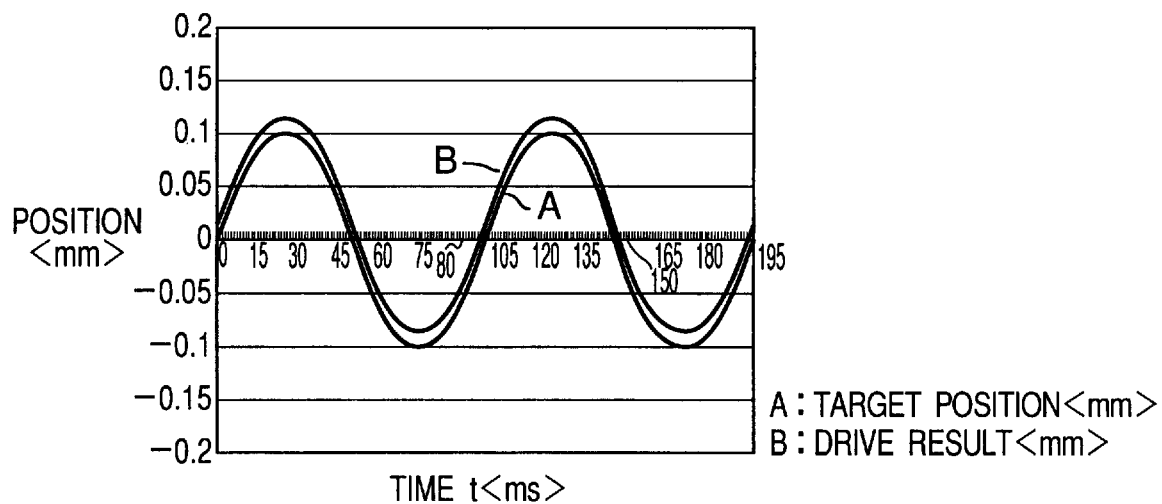
FIG. 16B is a graph explaining a relation between target position and drive result when offset voltage is applied.
Figure 17A:
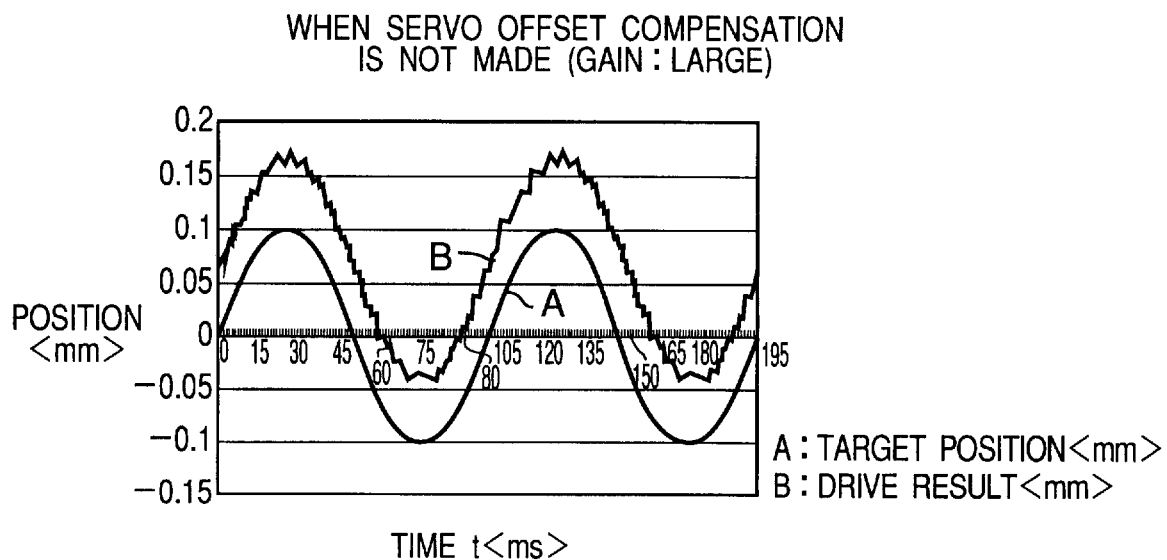
FIG. 17A is a graph explaining a relation between target position and drive result when offset voltage is not applied.
Figure 17B:
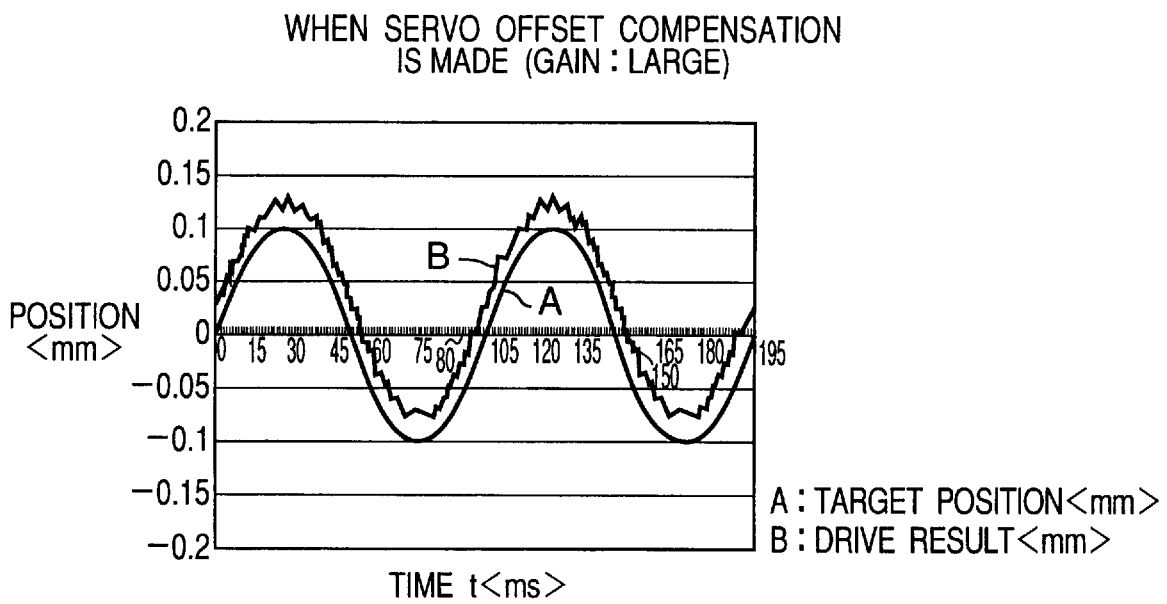
FIG. 17B is a graph explaining a relation between target position and drive result when offset voltage is applied.
Figure 18:
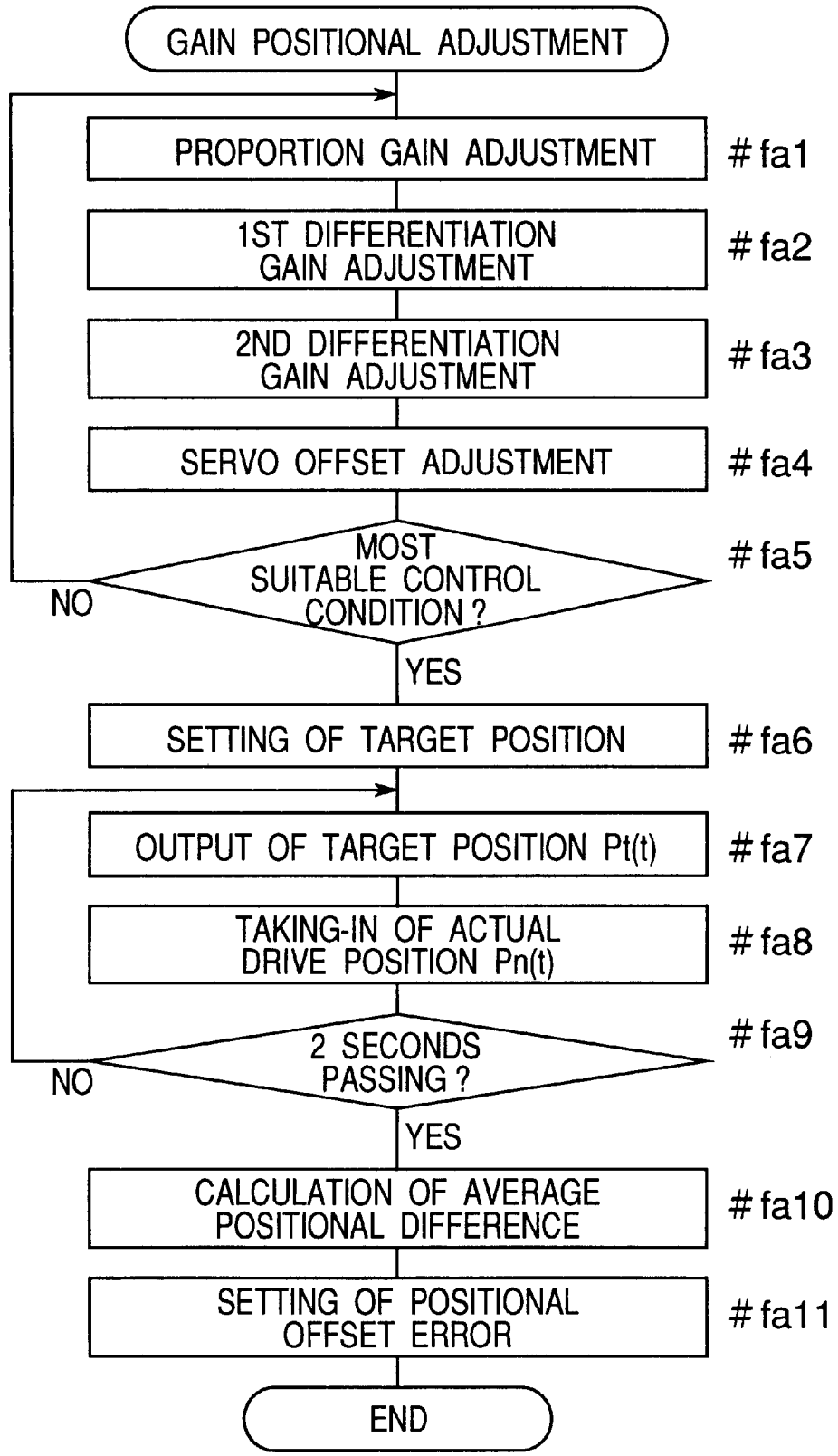
FIG. 18 is a flowchart explaining a procedure of the gain adjustment, the offset voltage adjustment and the actual measurement of offset error.

FIGS. 16A, 16B, 17A and 17B are graphs showing that control characteristics (or control properties) are stabilized by applying the offset voltage thereto. Each of FIGS. 16A and 16B shows a case in which the gain is middle; and each of FIGS. 17A and 17B shows a case in which the gain is large.

More specifically, FIG. 16A shows the case in which the offset voltage is not applied thereto, regarding the result of actual drive of the driven member (optional compensation system in the embodiment) with respect to a predetermined target position (i.e. curve A). On the other hand, FIG. 16B shows the case in which the offset voltage is applied thereto, regarding the result of actual drive of the driven member (optional compensation system in the embodiment) with respect to the same predetermined target position (i.e. curve A). As can be seen from both the figures, the vibration of the curve B is suppressed by applying the offset voltage thereto. This means that the vibration of the driven member is suppressed by applying the offset voltage thereto, thus allowing the drive characteristic (i.e. drive property) of the servo control to become stable.

Although FIGS. 17A and 17B show the case in which the gain is larger, it can be seen from both the figures that the drive characteristic of the servo control is also stable, as well as in the case of FIGS. 16A and 16B.

In FIG. 16B and FIG. 17B, the distance between the curve A and the curve B represents a positional error that remains after applying the offset voltage (i.e. positional offset error) thereto. In FIGS. 16A, 16B, 17A and 17B, the application of the offset voltage thereto causes the curve B (drive result position) to approach the curve A (target position). However, depending on the target position, the application of the offset voltage thereto may cause the curve B to go away from the curve A. More concretely, when the drive result position with no application of the offset voltage is on a side that the shape memory alloy elongates or extends, the application of the negative offset voltage causes the curve B to go away from the curve A. Conversely, when the drive result position with no application of the offset voltage is on a side that the shape memory alloy contracts or shrinks, the application of the negative offset voltage causes the curve B to approach the curve A. This is because the offset voltage is all the time a negative voltage, and because the application of this voltage thereto prevents the shape memory alloy from being rather overheated and from being over-contracted (i.e. shrunk too much).

The concrete value (or actual value) of the offset voltage is determined by observing the actuator being actually driven when any artificial shakes (or pseudo-shake, or false shake) are given to the camera at the final stage of the camera manufacturing process. Further, an offset error remaining after such an offset voltage is applied, is also measured, and the offset error is stored. (or memorized) into the camera. Namely, the value of the offset voltage, and the offset error, are unique values (or peculiar values) of individual products. This procedure is explained with reference to the flowchart. of FIG. 18.

A sine wave having a specified parameter, as an artificial shake, is given to the camera. Then, while the actual drive position of the optical compensation system to be driven for the purpose of compensating the camera shake is being monitored on the basis of an output of the position detection part (refer to FIG. 5), adjustments for the proportional gain, the first differential gain, the second differential gain, are performed, at step #fa1, step #fa2 and step #fa3 successively. The gain adjustment is performed by changing the resistances in the circuits c4–c6 (see FIG. 6). After the individual gains are adjusted, the adjustment of the offset voltage is performed at step #fa4. The value of the offset voltage, which is set to prevent the shape memory alloy from being rather overheated, has a negative value at all the time. That is, the offset voltage is intended to suppress the voltage which is supplied to the shape memory alloy. The adjustments of the aforementioned steps #fa1–#fa4 are repeated until its driving stability falls within a desired range. When the driving stability has fallen within the desired range, it is determined that the state of the drive control has been optimized, and the program proceeds to steps after the step #fa5. In other words, firstly, a controlling state with a high driving stability is realized through the steps #fa1 to #fa5, and, secondly, an offset error that has occurred due to the application of the offset voltage is actually measured at the following steps. Namely, at step #fa5, it is determined whether or not the control condition is the most suitable. If it is determined that the control condition is the most suitable at the step, the subsequent steps are executed.

That is, also for the measurement of the offset error, a sine wave having a specific parameter is given to the camera as an artificial camera shake. A target position Pt(t) for the driven member which is required to cancel the camera shake, is calculated (or set) by the target position calculation part a9 (refer to FIG. 14) at step #fa6, and then the target position Pt(t) is outputted to the servo controlling circuit at intervals of 1 ms at step #fa7. An actual drive position (or actual driven position) Pn(t) gained in correspondence to the target position, in which the actual drive position Pn(t) is gained after the driven member has been actually driven, is detected by the position detection part and is taken into the actual drive position taking-in part a14 (see FIG. 14) at step #fa8. The calculation of the target position Pt(t) and the detection of the actual drive position Pn(t) are performed in a continuation of two. seconds. Since the calculation of the target position is performed at intervals of 1 ms, the calculation of the target position Pt(t) and the detection of the actual drive position Pn(t) are performed 2000 times in total during the two seconds (refer to steps #fa7, #fa8 and #fa9). Subtracting the actual drive position Pn(t) from the target position Pt(t) allows a positional control error to be gotten. A mean value (or average value) of 2000 times of the errors is calculated, and then it is stored into the target position compensation part a10 (see FIG. 1) of the camera as an offset error at steps #fa10 and #fa11. By the way, the gain adjustment and the actual measurement of the offset error are carried out with respect to the X-direction and the Y-direction, independently of each other; and the actual measurement of the offset error needs to be performed after the gain adjustment and the offset voltage adjustment have been completed.

As explained above, because the offset error unique to each product has been stored, or memorized, by the camera itself in the aforementioned manner, the offset error can be canceled by subtracting the offset error from the target position which is calculated by the target position calculation part a9 (refer to FIG. 1).

Figure 19:
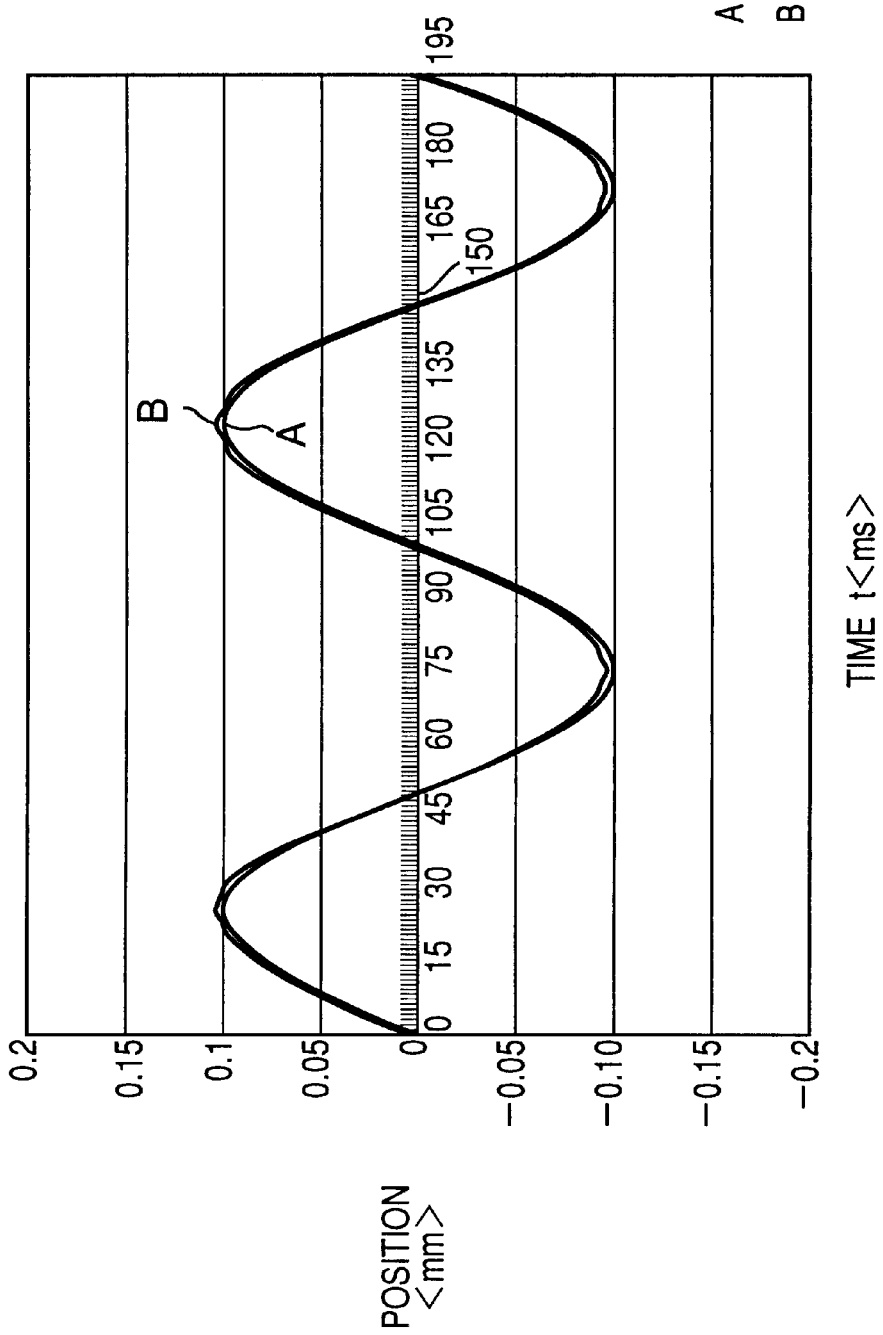
FIG. 19 is an explanatory graph showing an effect with the offset error being compensated.

FIG. 19 shows a relation between a target position and an actual drive position in a case that the servo control is performed in view of the offset error memorized in the camera itself. From the figure, it is apparent that the offset errors shown in FIG. 16B and FIG. 17B are cancelled, and that almost an error-free positional control (i.e. positional control almost having no error) is achieved. By the way, the calculation of the actual target position is performed together with temperature compensation and the like, in view of not only the offset error, but also change in temperature.

In the above embodiment, at the steps #fa1–#fa5, the process for the optimization, including the optimization of the setting of the gains in individual circuits and of the setting of offset voltage, is executed.

As a modification to the embodiment, the adjustment method of the present invention can apply to any servo control in which no offset voltage is applied.

Figure 20:
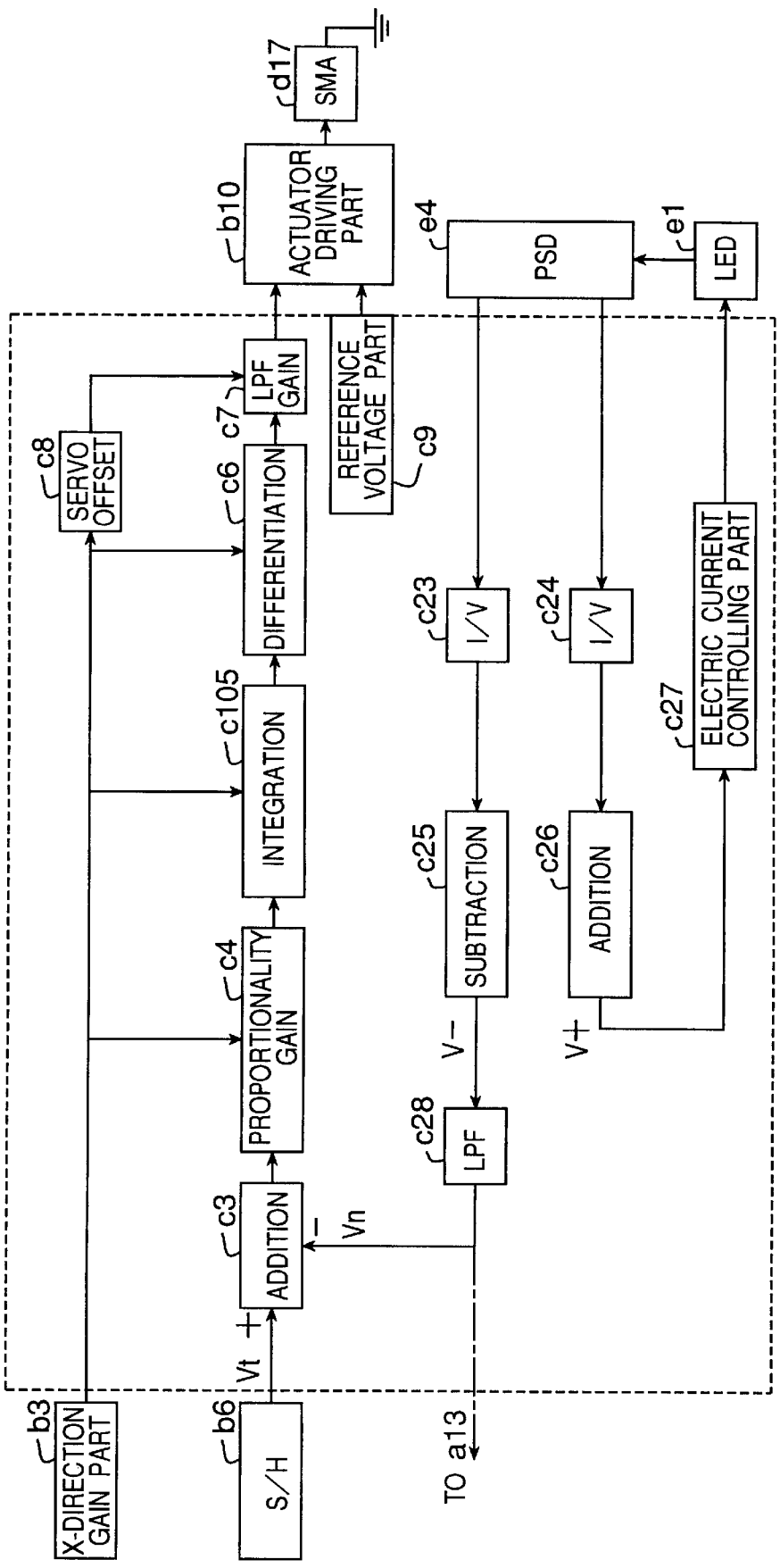
FIG. 20 is a view showing a circuit of the servo controlling part according to a modification to the embodiment.

FIG. 20 shows a servo controlling part according to a modification to the servo controlling part shown in FIG. 6. According to the aforementioned embodiment, since the servo controlling part includes the proportional gain circuit c4 and the differential gain circuits c5, c6, the servo controlling part realizes the PDD control as explained above. On the other hand, the servo circuit of FIG. 20 employs an integral gain circuit c105, instead of employing the differential gain circuit c5 of FIG. 6. With this arrangement, the PID control is realized. The PID control is effective to a case where it is desired to enhance the stop position control of a driven member in a control system in which the driven member slowly moves at low frequencies. Gain adjustment, offset voltage adjustment and actual measurement of offset error can be executed in the same manner as is the aforementioned embodiment.

Although the present invention has been fully described in connection with the preferred embodiment thereof with reference to the accompanying drawings, it is to be noted that various other changes and modifications are also apparent to those skilled in the art. Such changes and modifications are to be understood as included within the scope of the present invention as defined by the appended claims unless they depart therefrom.

What is claimed is:

1. A control mechanism comprising:
    a shape memory alloy which memorizes a predetermined dimension thereof;
    a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator;
    an operation means for performing an operation repeatedly on a basis of information upon a target position and an actual position of the driven member, and for calculating a voltage to be supplied to the shape memory alloy; and
    a voltage supplier having a limiting circuit for supplying the voltage, calculated by the operation means, to the shape memory alloy, only when the driven member is moved in the first direction, on a basis of a result of the operation performed by the operation means.

2. The control mechanism as claimed in claim 1, wherein the biasing device is a spring.

3. The control mechanism as claimed in claim 1, wherein the limiting circuit of the voltage supplier puts a limit with respect to a final output of the operation means.

4. The control mechanism as claimed in claim 1, wherein the driven member is an optical system for compensating a shake, caused by a manual operation, of an apparatus in which the control mechanism is provided.

5. A control mechanism comprising:
    a shape memory alloy which memorizes a predetermined dimension thereof;
    a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator;
    an operation means for performing an operation repeatedly on a basis of information upon a target position and an actual position of the driven member, and for calculating a voltage to be supplied to the shape memory alloy; and
    a voltage supplier having a limiting circuit for limiting a supply of the voltage, calculated by the operation means, to the shape memory alloy, when the driven member is moved in the second direction, on a basis of a result of the operation performed by the operation means.

6. The control mechanism as claimed in claim 5, wherein the biasing device is a spring.

7. The control mechanism as claimed in claim 5, wherein the limiting circuit of the voltage supplier puts a limit with respect to a final output of the operation means.

8. The control mechanism as claimed in claim 5, wherein the driven member is an optical system for compensating a shake, caused by a manual operation, of an optical apparatus in which the control mechanism is provided.

9. A control mechanism for controlling a position of a driven member in a first direction and in a second direction by an actuator, the control mechanism comprising:
    a target position determination means for determining a target position to which the driven member is to be moved;
    an actual position detection means for detecting an actual position of the driven member; and
    a control output operation means for calculating a difference between the target position and the actual position and performing differential calculus two times on said difference to produce a control output.

10. The control mechanism as claimed in claim 9, wherein the actuator is constituted by:
    a shape memory alloy which memorizes a predetermined dimension thereof; and
    a biasing device for exerting a biasing force on the shape memory alloy and for changing dimension of the shape memory alloy.

11. The control mechanism as claimed in claim 10, wherein the biasing device is a spring.

12. The control mechanism as claimed in claim 9, wherein the actuator is constituted by a pair of shape memory alloys each of which memorizes a predetermined dimension thereof.

13. The control mechanism as claimed in claim 9, wherein the control output operation means executes a PDD control.

14. The control mechanism as claimed in claim 9, wherein the driven member is an optical system for compensating a shake, caused by a manual operation, of an optical apparatus in which the control mechanism is provided.

15. A control mechanism for controlling a position of a driven member in a first direction and in a second direction by an actuator, the control mechanism comprising:
   a target value determination means for determining a target value with which the driven member is to be moved;
   an actual value detection means for detecting an actual value of the driven member; and
   a control output operation means for calculating a difference between the target value and the actual value and performing a phase compensation calculation a plurality of times on said difference.

16. The control mechanism as claimed in claim 15, wherein the actuator is constituted by:
   a shape memory alloy which memorizes a predetermined dimension thereof; and
   a biasing device for exerting a biasing force on the shape memory alloy and for changing dimension of the shape memory alloy.

17. The control mechanism as claimed in claim 16, wherein the biasing device is a spring.

18. The control mechanism as claimed in claim 15, wherein the actuator is constituted by a pair of shape memory alloys each of which memorizes a predetermined dimension thereof.

19. The control mechanism as claimed in claim 15, wherein the control output operation means executes a PDD control.

20. The control mechanism as claimed in claim 15, wherein the driven member is an optical system for compensating a shake, caused by a manual operation, of an optical apparatus in which the control mechanism is provided.

21. A control mechanism comprising:
   a shape memory alloy which memorizes a predetermined dimension thereof;
   a biasing device for exerting a biasing force on the shape memory alloy and for changing dimension of the a shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator;
   a target position determination means for determining a target position to which the driven member is to be moved;
   an actual position detection means for detecting an actual position of the driven member;
   a control output operation means for calculating a control output by executing an operation relative to a difference between the target position and the actual position; and
   a compensation means for restraining heating of the shape memory alloy with respect to a result of the operation executed by the control output operation means in order to stabilize a drive control of the actuator.

22. The control mechanism as claimed in claim 21, wherein the biasing device is a spring.

23. A control mechanism comprising:
   a shape memory alloy which memorizes a predetermined dimension thereof;
   a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator;
   a target position determination means for determining a target position to which the driven member is to be moved;
   an actual position detection means for detecting an actual position of the driven member;
   a control output operation means for calculating a control output by executing an operation relative to a difference between the target position and the actual position; and
   a compensation means for correcting a voltage which is supplied to the shape memory alloy with respect to a result of the operation executed by the control output operation means, in which the correction of the voltage is made by adding an offset voltage.

24. The control mechanism as claimed in claim 23, wherein the offset voltage is a negative voltage.

25. The control mechanism as claimed in claim 23, wherein the biasing device is a spring.

26. A method for adjusting servo control of a control mechanism, in which the control mechanism comprises:
   a shape memory alloy which memorizes a predetermined dimension thereof;
   a biasing device for exerting a biasing force on the shape memory alloy and for changing dimension of the shape memory alloy, wherein the shape memory alloy and the biasing device constitute an actuator for moving a driven member which is driven by the actuator, and wherein the driven member is controlled to move in a first direction in which the shape memory alloy returns to the predetermined dimension and in a second direction in which the biasing means changes the dimension of the shape memory alloy, so as to control a position of the driven member, by the actuator;
   a target position determination means for determining a target position to which the driven member is to be moved;
   an actual position detection means for detecting an actual position of the driven member; and
   a servo control circuit which executes a servo control on the basis of information upon the target position and the actual position,
   the method comprising the steps of:
      optimizing a gain setting of the servo control circuit within a predetermined permissible range;
      detecting the actual position to which the driven member is actually driven to move, after the optimization, by the actual position detection means, and actually measuring a difference between the actual position and the target position; and
      making the control mechanism itself memorize the difference thus measured actually.

27. The method as claimed in claim 26, wherein the servo control circuit comprises a compensation circuit for restricting heating of the shape memory alloy so that a drive control of the actuator is stabilized, and wherein the step of optimizing the gain setting thereof further comprises a step of optimizing a value of compensation which is executed by the compensation circuit.

28. The method as claimed in claim 26, wherein the biasing device is a spring.

* * * * *